(12) United States Patent
Andou et al.

(10) Patent No.: US 11,555,655 B2
(45) Date of Patent: Jan. 17, 2023

(54) HEAT EXCHANGER AND HEAT PUMP DEVICE

(71) Applicant: DAIKIN INDUSTRIES, LTD., Osaka (JP)

(72) Inventors: Tooru Andou, Osaka (JP); Yoshiyuki Matsumoto, Osaka (JP); Tomoki Hirokawa, Osaka (JP); Hideyuki Kusaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/592,874

(22) Filed: Feb. 4, 2022

(65) Prior Publication Data

US 2022/0155017 A1 May 19, 2022

Related U.S. Application Data

(63) Continuation of application No. PCT/JP2020/030457, filed on Aug. 7, 2020.

(30) Foreign Application Priority Data

Aug. 7, 2019 (JP) .............................. JP2019-145539

(51) Int. Cl.
*F28D 7/16* (2006.01)
*F25B 13/00* (2006.01)
*F28F 9/02* (2006.01)

(52) U.S. Cl.
CPC ................ *F28D 7/16* (2013.01); *F25B 13/00* (2013.01); *F28F 9/02* (2013.01)

(58) Field of Classification Search
CPC ..... F28D 7/16; F25B 13/00; F28F 9/02; F28F 9/0202; F28F 9/0217; F28F 9/0221
(Continued)

(56) References Cited

U.S. PATENT DOCUMENTS

| 5,241,839 | A | 9/1993 | Hughes |
| 7,044,208 | B2 * | 5/2006 | Kawakubo .......... F28D 1/05375 165/173 |
| 7,152,669 | B2 * | 12/2006 | Kroetsch ............... F28F 9/0265 165/149 |

(Continued)

FOREIGN PATENT DOCUMENTS

| EP | 2998680 A1 | 3/2016 |
| EP | 3064880 A1 | 9/2016 |

(Continued)

OTHER PUBLICATIONS

International Search Report issued in corresponding International Application No. PCT/JP2020/030457 dated Oct. 6, 2020 (5 pages).

(Continued)

*Primary Examiner* — Tho V Duong
*Assistant Examiner* — Raheena R Malik
(74) *Attorney, Agent, or Firm* — Osha Bergman Watanabe & Burton LLP

(57) ABSTRACT

A heat exchanger includes: a gas-refrigerant pipe; a header connected to the gas-refrigerant pipe; and heat transfer tubes connected to the header. The header includes: a first plate member; and a second plate member that is stacked on the first plate member in a plate-thickness direction. The first plate member includes a first opening that constitutes an internal space of the header. The second plate member includes a second opening that, together with the first opening, constitutes the internal space of the header. The internal space of the header communicates with the heat transfer tubes. A first direction is perpendicular to both the plate-thickness direction and a direction in which the heat transfer tubes are arranged. A width of a part of the first opening in the first direction is different from a width of the second opening in the first direction.

9 Claims, 17 Drawing Sheets

(58) Field of Classification Search
USPC ........................................................ 165/175
See application file for complete search history.

(56) References Cited

U.S. PATENT DOCUMENTS

| | | | | |
|---|---|---|---|---|
| 7,571,761 | B2* | 8/2009 | Katoh | F28F 9/0221 |
| | | | | 165/174 |
| 7,819,177 | B2* | 10/2010 | Beamer | F28F 9/0246 |
| | | | | 165/174 |
| 9,103,598 | B2* | 8/2015 | Bellenfant | F28D 1/0408 |
| 10,281,223 | B2* | 5/2019 | Hofmann | F28F 9/0224 |
| 2003/0188857 | A1* | 10/2003 | Kawakubo | F28F 9/0243 |
| | | | | 165/174 |
| 2009/0229800 | A1* | 9/2009 | Bhatti | F28D 1/0426 |
| | | | | 165/165 |
| 2013/0175013 | A1 | 7/2013 | Yoshioka et al. | |
| 2022/0042745 | A1* | 2/2022 | Hirokawa | F28F 9/0224 |
| 2022/0099374 | A1* | 3/2022 | Hirokawa | F28F 1/32 |
| 2022/0120504 | A1* | 4/2022 | Yamada | F28F 9/22 |
| 2022/0155016 | A1* | 5/2022 | Yamada | F28F 9/02 |
| 2022/0155017 | A1* | 5/2022 | Andou | F25B 13/00 |

FOREIGN PATENT DOCUMENTS

| | | |
|---|---|---|
| JP | 2007170715 A | 7/2007 |
| JP | 2012093075 A | 5/2012 |
| WO | 2014184918 A1 | 11/2014 |
| WO | 2015063875 A1 | 5/2015 |

OTHER PUBLICATIONS

Notice of Reasons for Refusal issued in corresponding Japanese Patent Application No. 2020-134840 dated Mar. 30, 2021 (12 pages).

Decision to Grant a Patent issued in corresponding Japanese Patent Application No. 2020-134840 dated Jun. 29, 2021 (5 pages).

International Preliminary Report on Patentability issued in corresponding International Application No. PCT/JP2020/030457 dated Feb. 17, 2022 (7 pages).

Extended European Search Report issued in corresponding European Patent Application No. 20849721.4, dated Aug. 23, 2022 (9 pages).

* cited by examiner

HEAT EXCHANGER AND HEAT PUMP DEVICE

CROSS-REFERENCE TO RELATED APPLICATIONS

This is a continuation application of International Patent Application No. PCT/JP2020/024392, filed on Jun. 22, 2020, and claims priority to Japanese Patent Application No. 2019-147901, filed on Aug. 9, 2019. The content of these priority applications are incorporated herein by reference.

TECHNICAL FIELD

The present disclosure relates to a heat exchanger and a heat pump device.

BACKGROUND

Hitherto, a refrigerant cycle device, such as an air conditioner, has used a heat exchanger constituted by connecting heat transfer tubes in which a refrigerant flows to a header.

For example, in a heat exchanger described in Patent Literature 1 (PTL 1), a header having a circular cylindrical internal space and a flow path for allowing a refrigerant that flows in the internal space to flow by being branched toward each flat tube is used.

PATENT LITERATURE

PTL 1: Japanese Unexamined Patent Application Publication No. 2012-093075

SUMMARY

A heat exchanger according to one or more embodiments includes a header and a plurality of heat transfer tubes. The header is one to which a gas-refrigerant pipe is connected. The plurality of heat transfer tubes are connected to the header. The header includes a first plate member and a second plate member. The second plate member is stacked on the first plate member in a plate-thickness direction. The first plate member includes a first opening that constitutes an internal space of the header. The second plate member includes a second opening that, together with the first opening, constitutes the internal space of the header. The internal space communicates with the plurality of heat transfer tubes. The first opening includes a portion whose width in a first direction differs from a width of the second opening in the first direction, or a width of the first opening in the first direction is the same as the width of the second opening in the first direction. The first direction is a direction perpendicular to both the plate-thickness direction and a direction in which the plurality of heat transfer tubes are arranged.

DETAILED DESCRIPTION

An air conditioner using a heat exchanger according to one or more embodiments of the present disclosure is described below.

(1) Structure of Air Conditioner

An air conditioner 1 is described with reference to the drawings.

Figure 1:
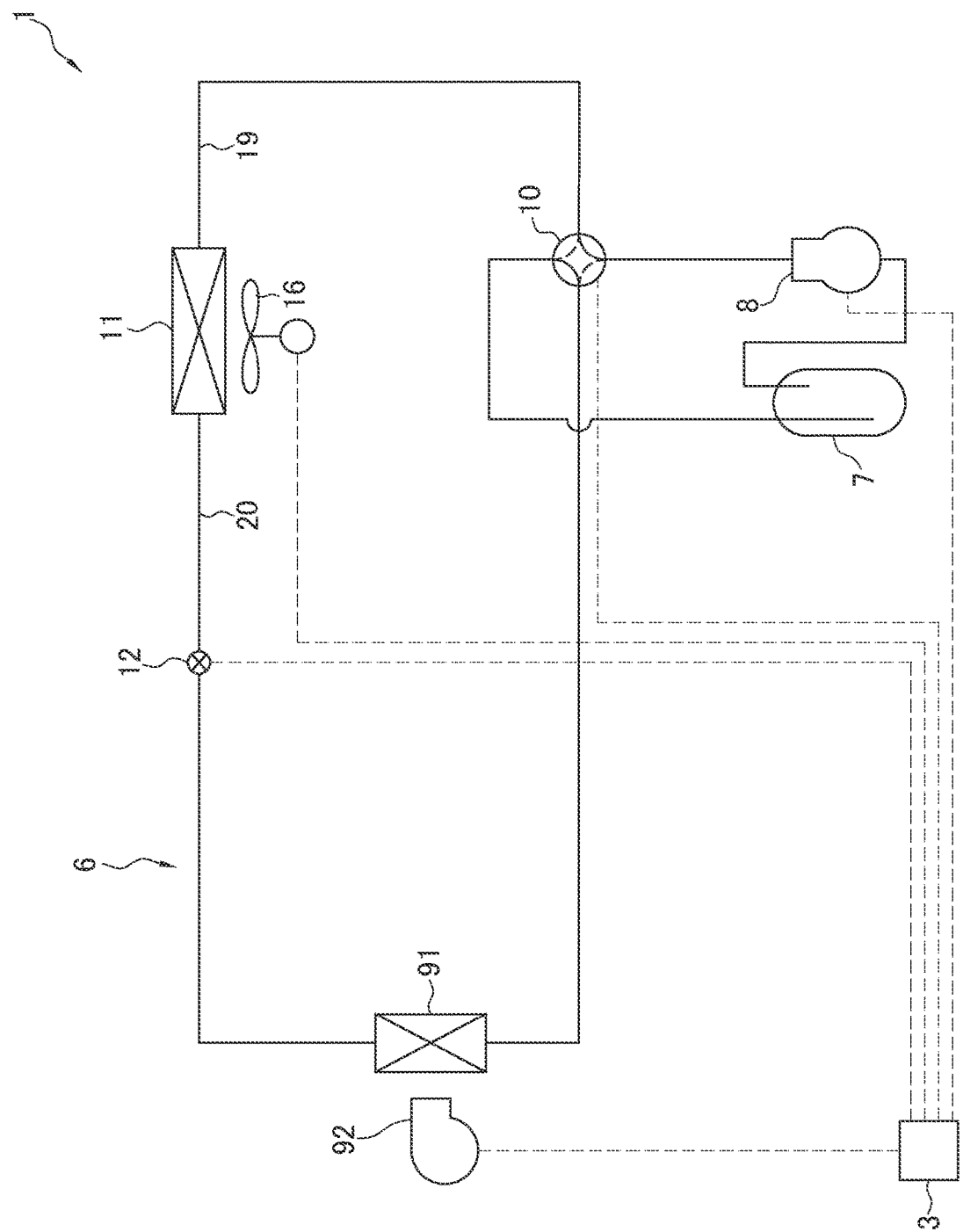
FIG. 1 is a schematic structural view of an air conditioner according to one or more embodiments.

FIG. 1 is a schematic structural view of the air conditioner 1 including a heat exchanger according to one or more embodiments of the present disclosure as an outdoor heat exchanger 11.

The air conditioner 1 (an example of the heat pump device) is a device that cools and heats a space to be air-conditioned by performing a vapor-compression refrigeration cycle. The space to be air-conditioned is, for example, a space in buildings, such as office buildings, commercial facilities, or residences. Note that the air conditioner is merely one example of a refrigerant cycle device, and the heat exchanger of the present disclosure may be used in other refrigerant cycle devices, such as a refrigerator, a freezer, a water heater, or a floor heating device.

As shown in FIG. 1, the air conditioner 1 mainly includes a refrigerant circuit 6, an outdoor fan 16, an indoor fan 92, and a control unit 3 that controls devices that constitute the refrigerant circuit 6, the outdoor fan 16, and the indoor fan 92.

The refrigerant circuit 6 mainly includes an accumulator 7, a compressor 8, a four-way switching valve 10, an outdoor heat exchanger 11, an expansion valve 12, and an indoor heat exchanger 91.

A refrigerant is sealed in the refrigerant circuit 6. As the refrigerant, for example, a carbon dioxide refrigerant can be used. When a refrigeration cycle is performed by circulating a carbon dioxide refrigerant in the refrigerant circuit 6, the carbon dioxide refrigerant is used so as to be temporarily in a supercritical state.

The compressor 8 is a device that sucks in a refrigerant having a low pressure in a refrigeration cycle, compresses the refrigerant at a compression mechanism (not shown), and discharges the compressed refrigerant.

The four-way switching valve 10 is a mechanism that, by switching a direction of flow of a refrigerant, changes the state of the refrigerant circuit 6 between a cooling operation state and a heating operation state. When the refrigerant circuit 6 is in the cooling operation state, the outdoor heat exchanger 11 functions as a heat dissipater (condenser) of a refrigerant and the indoor heat exchanger 91 functions as an evaporator of a refrigerant. When the refrigerant circuit 6 is in the heating operation state, the outdoor heat exchanger 11 functions as an evaporator of a refrigerant and the indoor heat exchanger 91 functions as a condenser of a refrigerant. When the state of the refrigerant circuit 6 is the cooling operation state, the four-way switching valve 10 is switched to a connection state shown by a solid line in the four-way switching valve 10 of FIG. 1, and when the state of the refrigerant circuit 6 is the heating operation state, the four-way switching valve 10 is switched to a connection state shown by a broken line in the four-way switching valve 10 of FIG. 1.

The outdoor heat exchanger 11 (an example of the heat exchanger) is a device that is disposed outside a space to be air-conditioned and causes a refrigerant that flows in the outdoor heat exchanger and outdoor air (heat source air) to exchange heat with each other. The outdoor heat exchanger 11 is described in detail below.

A gas refrigerant side of the outdoor heat exchanger 11 is connected to the four-way switching valve 10 via a gas-refrigerant pipe 19, and a liquid refrigerant side of the outdoor heat exchanger 11 is connected to the expansion valve 12 via a liquid-refrigerant pipe 20.

The expansion valve 12 is disposed between the outdoor heat exchanger 11 and the indoor heat exchanger 91 in the refrigerant circuit 6. The expansion valve 12 adjusts the pressure and the flow rate of a refrigerant that flows in the liquid-refrigerant pipe 20.

The accumulator 7 is a container having a gas-liquid dividing function of dividing a refrigerant that flows in into a gas refrigerant and a liquid refrigerant.

In the indoor heat exchanger 91, a refrigerant that flows in the indoor heat exchanger 91 and air in a space to be air-conditioned exchange heat with each other. Although the type of indoor heat exchanger 91 is not limited, the indoor heat exchanger 91 is, for example, a fin-and-tube heat exchanger including a plurality of heat transfer tubes and fins that are not shown. Note that a plurality of the indoor heat exchangers 91 may be disposed in parallel in the refrigerant circuit 6.

The outdoor fan 16 is a fan that supplies heat source air to the outdoor heat exchanger 11 and that generates an air flow for discharging air that has exchanged heat with a refrigerant in the outdoor heat exchanger 11.

The indoor fan 92 is a fan that supplies air in a space to be air-conditioned to the indoor heat exchanger 91 and that generates an air flow for blowing air that has exchanged heat with a refrigerant in the indoor heat exchanger 91 to the space to be air-conditioned.

The control unit 3 is a functional part that controls the operations of various devices that constitute the air conditioner 1. The control unit 3 is, for example, a microcomputer or a unit including, for example, a memory that stores various programs for controlling the air conditioner 1, which are executable by the microcomputer.

As shown in FIG. 1, the control unit 3 is electrically connected to various devices including the compressor 8, the four-way switching valve 10, the expansion valve 12, the outdoor fan 16, and the indoor fan 92. The control unit 3 is electrically connected to various sensors (not shown). The control unit 3 is constituted to allow communication with a remote controller (not shown) that is operated by a user of the air conditioner 1.

The control unit 3 controls the operation and stopping of the air conditioner 1 or the operations of the various devices that constitute the air conditioner 1, based on, for example, a measurement signal of each of the various sensors or an instruction that is received from a remote controller (not shown).

(2) Structure of Outdoor Heat Exchanger

A structure of the outdoor heat exchanger 11 is described with reference to the drawings.

Figure 2:
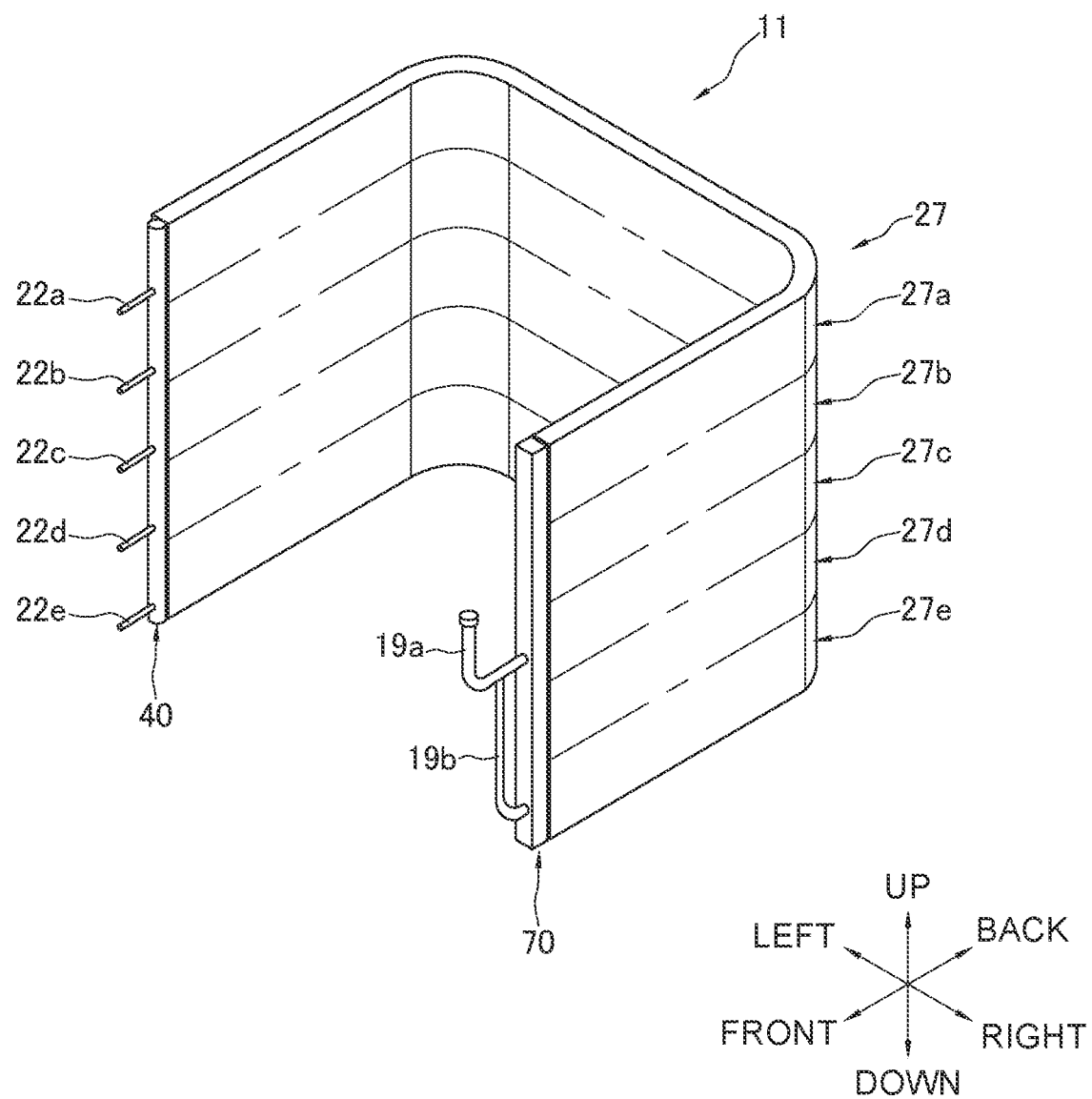
FIG. 2 is a schematic perspective view of an outdoor heat exchanger according to one or more embodiments.
Figure 3:
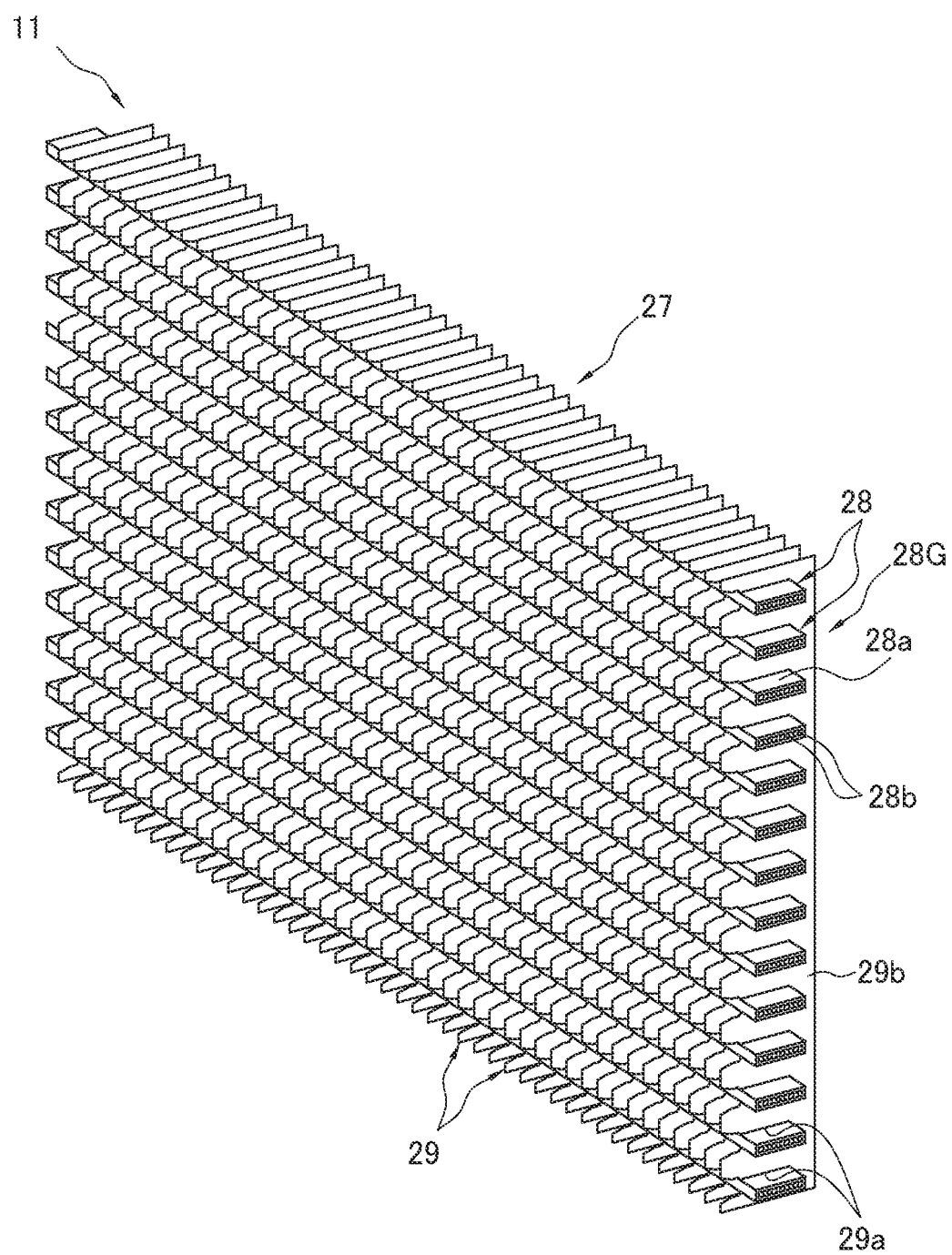
FIG. 3 is an enlarged view of a portion of a heat exchange portion of the outdoor heat exchanger according to one or more embodiments.
Figure 4:
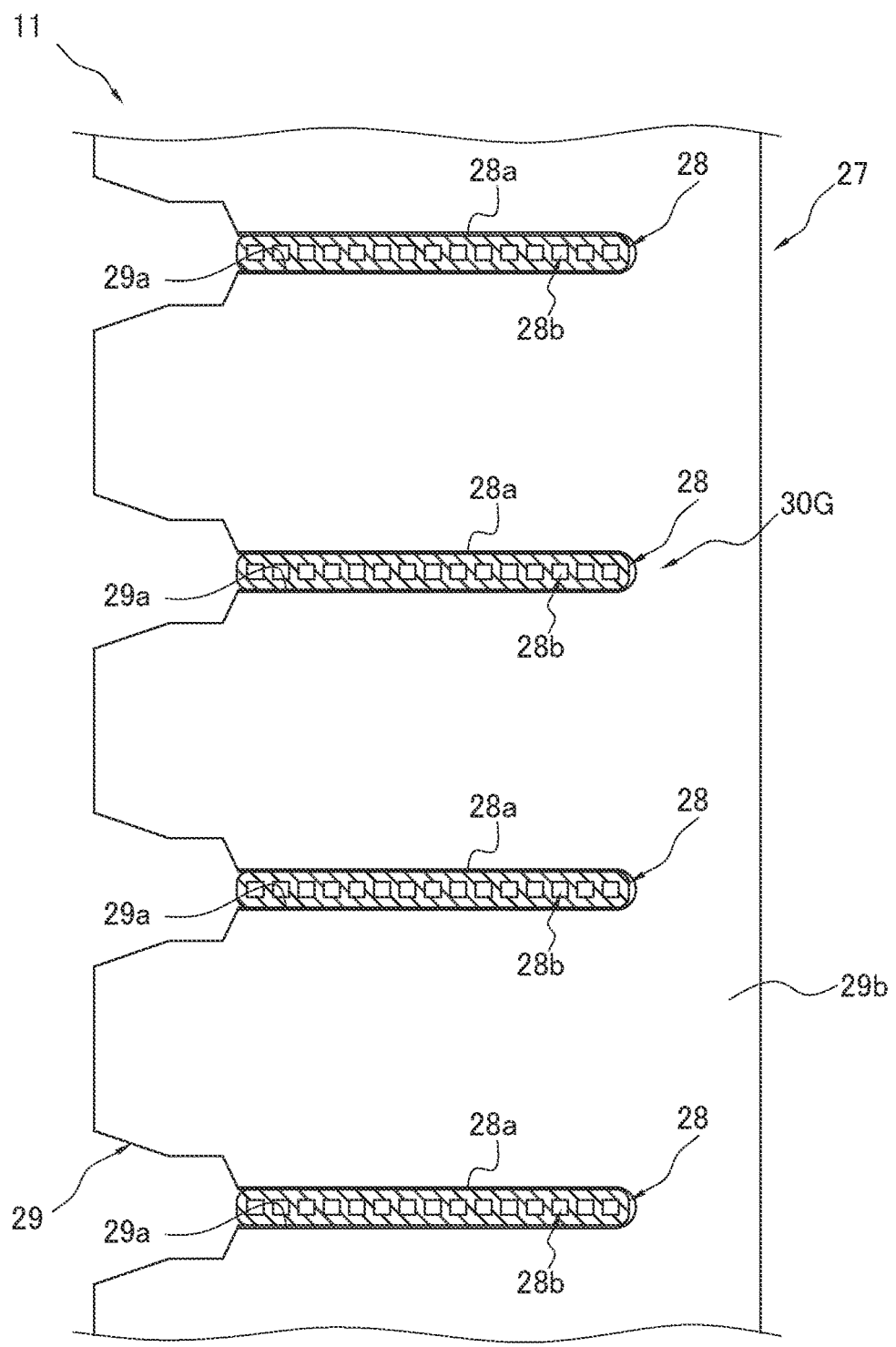
FIG. 4 is a schematic view showing heat transfer fins mounted on flat tubes in the heat exchange portion according to one or more embodiments.
Figure 5:
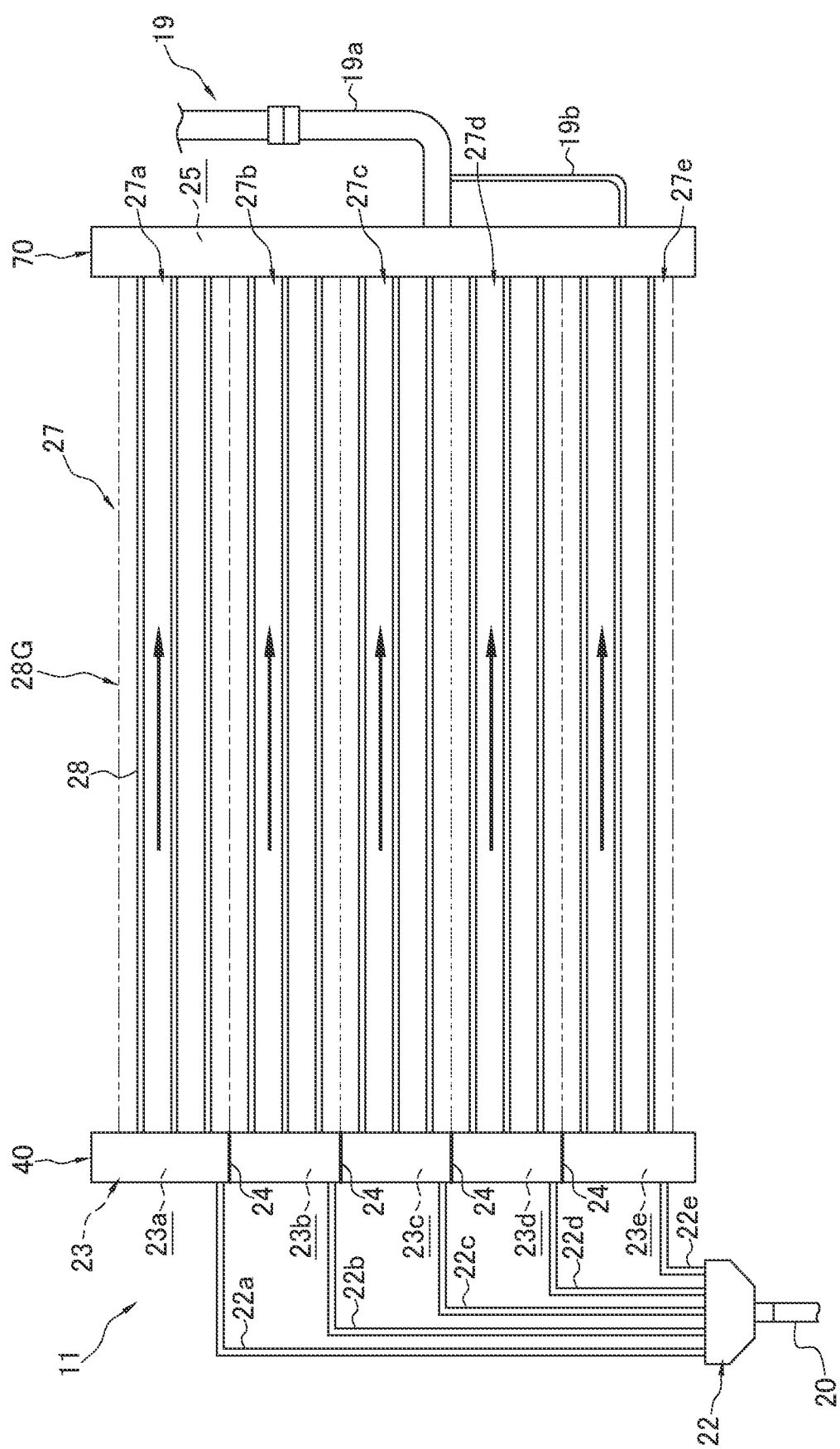
FIG. 5 is an explanatory view showing a state of flow of a refrigerant in the outdoor heat exchanger functioning as an evaporator of the refrigerant according to one or more embodiments.

FIG. 2 is a schematic perspective view of the outdoor heat exchanger 11. FIG. 3 is an enlarged view of a portion of a heat exchange portion 27 (described below) of the outdoor heat exchanger 11. FIG. 4 is a schematic view showing fins 29 (described below) mounted on flat tubes 28 in the heat exchange portion 27. FIG. 5 is a schematic structural view of the outdoor heat exchanger 11. The arrows in the heat exchange portion 27 shown in FIG. 5 indicate flow of a refrigerant at the time of a heating operation (when the outdoor heat exchanger 11 functions as an evaporator).

Note that, in the description below, for describing an orientation and a position, terms, such as "up", "down", "left", "right", "front (front side)", or "back (back side)" may be used. Unless otherwise specified, these terms are in conformity with the directions of the arrows shown in FIG. 2. Note that these terms that indicate these directions and positions are used for convenience of explanation, and, unless otherwise specified, the orientation and the position of the entire outdoor heat exchanger 11 and the orientation and the position of each structure of the outdoor heat exchanger 11 are not to be determined by the orientations and the positions indicated by these terms.

The outdoor heat exchanger 11 is a device that causes heat to be exchanged between a refrigerant that flows therein and air.

The outdoor heat exchanger 11 mainly includes a distributor 22, a flat tube group 28G including the plurality of flat tubes 28, the plurality of fins 29, a liquid header 40, and a gas header 70 (an example of the header) (see FIGS. 4 and 5). In one or more embodiments, the distributor 22, the flat tubes 28, the fins 29, the liquid header 40, and the gas header 70 are all made of aluminum or an aluminum alloy.

As described below, the flat tubes 28 and the fins 29 that are fixed to the flat tubes 28 form the heat exchange portion 27 (see FIGS. 2 and 3). The outdoor heat exchanger 11 is a device including the one-column heat exchange portion 27, and is not a device in which the plurality of flat tubes 28 are arranged in an air flow direction. In the outdoor heat exchanger 11, by causing air to flow in a ventilation path that is formed by the flat tubes 28 and the fins 29 of the heat exchange portion 27, a refrigerant that flows in the flat tubes 28 exchanges heat with the air that flows in the ventilation path. The heat exchange portion 27 is divided into a first heat exchange portion 27a, a second heat exchange portion 27b, a third heat exchange portion 27c, a fourth heat exchange portion 27d, and a fifth heat exchange portion 27e, which are arranged in an up-down direction (see FIG. 2).

(2-1) Distributor

The distributor 22 is a mechanism that divides a flow of a refrigerant. The distributor 22 is also a mechanism that merges refrigerants. The liquid-refrigerant pipe 20 is connected to the distributor 22. The distributor 22 includes a plurality of distributor pipes 22a to 22e. The distributor 22 has the function of dividing a flow of a refrigerant that has flowed into the distributor 22 from the liquid-refrigerant pipe 20 by the plurality of distributing pipes 22a to 22e and of guiding the separated portions of the refrigerant to a plurality of spaces that are formed in the liquid header 40. The distributor 22 also has the function of merging portions of the refrigerant that have flowed through the distributing pipes 22a to 22e from the liquid header 40 and of guiding the merged portions of the refrigerant to the liquid-refrigerant pipe 20.

(2-2) Flat Tube Group

The flat tube group 28G is an example of a heat transfer tube group. The flat tube group 28G includes the plurality of flat tubes 28 (examples of heat transfer tubes) as a plurality of heat transfer tubes. As shown in FIG. 3, the flat tubes 28 are flat heat transfer tubes having a flat surface 28a, which is a heat transfer surface, in the up-down direction. The plurality of flat tubes 28 are arranged in the up-down direction. As shown in FIG. 3, the flat tubes 28 have a plurality of refrigerant passages 28b in which a refrigerant flows. For example, the flat tubes 28 are flat multi-hole tubes where many refrigerant passages 28b in which a refrigerant flows and whose passage cross-sectional area is small are formed. In one or more embodiments, the plurality of refrigerant passages 28b are provided side by side in the air flow direction.

In the outdoor heat exchanger 11, as shown in FIG. 5, the flat tubes 28 extending in a horizontal direction between the liquid header 40 and the gas header 70 are arranged in the up-down direction in a plurality of stages. Note that, in one or more embodiments, the flat tubes 28 extending between the liquid header 40 and the gas header 70 are bent at two locations, and the heat exchange portion 27 that is constituted by the flat tubes 28 is formed in a substantially U shape in plan view (see FIG. 2). The flat tubes 28 extend in a front-back direction (an example of the first direction) at connection portions where the flat tubes 28 are connected to the gas header 70, and extend in the front-back direction at connection portions where the flat tubes 28 are connected to the liquid header 40. In one or more embodiments, the plurality of flat tubes 28 are disposed apart from each other by a certain interval in the up-down direction.

(2-3) Fins

The plurality of fins 29 are members for increasing the heat transfer area of the outdoor heat exchanger 11. Each fin 29 is a plate-shaped member extending in a direction in which the flat tubes 28 are arranged in layers. The outdoor heat exchanger 11 is used in a mode in which the plurality of flat tubes 28 extending in the horizontal direction are arranged in the up-down direction. Therefore, with the outdoor heat exchanger 11 being installed, each fin 29 extends in the up-down direction.

As shown in FIG. 4, a plurality of cut portions 29a extending in an insertion direction of the flat tubes 28 are formed in each fin 29 to allow the plurality of flat tubes 28 to be inserted therein. The cut portions 29a extend in the direction of extension of the fins 29 and in a direction orthogonal to a thickness direction of the fins 29. With the outdoor heat exchanger 11 being installed, the cut portions 29a in each fin 29 extend in the horizontal direction. The shape of the cut portions 29a of the fins 29 is substantially the same as the external shape of the cross section of the flat tubes 28. The cut portions 29a are formed in the fins 29 to be apart from each other by an interval corresponding to an arrangement interval of the flat tubes 28. In the outdoor heat exchanger 11, the plurality of fins 29 are arranged in the direction of extension of the flat tubes 28. By inserting the flat tubes 28 into the plurality of cut portions 29a of the plurality of fins 29, portions between the flat tubes 28 that are adjacent to each other are separated into a plurality of ventilation paths in which air flows.

Each fin 29 includes communication portions 29b communicating with each other in the up-down direction on an upstream side or a downstream side of the air flow direction with respect to the flat tubes 28. In one or more embodiments, the communication portions 29b of the fins 29 are positioned on a windward side with respect to the flat tubes 28.

(2-4) Gas Header and Liquid Header

The liquid header 40 and the gas header 70 are hollow members.

As shown in FIG. 5, one end portion of each flat tube 28 is connected to the liquid header 40, and the other end portion of each flat tube 28 is connected to the gas header 70. The outdoor heat exchanger 11 is disposed in a casing so that longitudinal directions of the substantially quadrangular prism-shaped liquid header 40 and gas header 70 are substantially the same as a vertical direction. In one or more embodiments, as shown in FIG. 2, the heat exchange portion 27 of the outdoor heat exchanger 11 has a U shape in plan view. The liquid header 40 is disposed near a left front corner of the casing (see FIG. 2). The gas header 70 is disposed near a right front corner of the casing (see FIG. 2).

(2-4-1) Liquid Header

The longitudinal direction of the liquid header 40 is the up-down direction.

A liquid-side internal space 23 of the liquid header 40 is divided into a plurality of sub-spaces 23a to 23e by a plurality of partition plates 24 (see FIG. 5).

The plurality of sub-spaces 23a to 23e are arranged in the up-down direction. The sub-spaces 23a to 23e do not communicate with each other in the liquid-side internal space 23 of the liquid header 40 as a result of being separated by a corresponding one or corresponding ones of the partition plates 24.

The distributing pipes 22a to 22e of the distributor 22 are connected in a one-to-one correspondence to the respective sub-spaces 23a to 23e. Therefore, in a cooling operation state, portions of a refrigerant that have reached the respective sub-spaces 23a to 23e flow into the respective distributing pipes 22a to 22e, and merge at the distributor 22. In a heating operation state, a refrigerant whose flow has been divided at the distributor 22 is supplied to each of the sub-spaces 23a to 23e.

(2-4-2) Gas Header

The longitudinal direction of the gas header 70 is the up-down direction (an example of the second direction).

A single space is formed inside the gas header 70. Partition plates, such as those provided at the liquid header 40, that separate spaces that are arranged in the up-down direction are not provided in a gas-side internal space 25 of the gas header 70.

A main gas-refrigerant pipe connection portion 19a and a branch gas-refrigerant pipe connection portion 19b that constitute an end portion of the gas-refrigerant pipe 19 on the side of the gas header 70 are connected to the gas header 70 (see FIG. 5). Note that, although not limited, the outside diameter of the main gas-refrigerant pipe connection portion 19a may be, for example, greater than or equal to three times, or greater than or equal to five times the outside diameter of the branch gas-refrigerant pipe connection portion 19b.

One end of the main gas-refrigerant pipe connection portion 19a is connected to the gas header 70 to communicate with the gas-side internal space 25 at an intermediate position on the gas header 70 in a height direction.

One end of the branch gas-refrigerant pipe connection portion 19b is connected to the gas header 70 to communicate with the gas-side internal space 25 near a lower end of the gas header 70 in the height direction. The other end of the branch gas-refrigerant pipe connection portion 19b is connected to the main gas-refrigerant pipe connection portion 19a. With the inside diameter of the branch gas-refrigerant pipe connection portion 19b being smaller than the inside diameter of the main gas-refrigerant pipe connection portion 19a and with the branch gas-refrigerant pipe connection portion 19b being connected to the gas header 70 at a location below the main gas-refrigerant pipe connection portion 19a, the branch gas-refrigerant pipe connection portion 19b is capable of bringing refrigerating-machine oil that is retained near the lower end of the gas header 70 into the main gas-refrigerant pipe connection portion 19a and returning the refrigerating-machine oil to the compressor 8.

(3) Flow of Refrigerant in Outdoor Heat Exchanger

When the air conditioner 1 performs a heating operation and thus the outdoor heat exchanger 11 functions as an evaporator of a refrigerant, a refrigerant in a gas-liquid two-phase state that has reached the distributor 22 from the liquid-refrigerant pipe 20 flows through the distributing pipes 22a to 22e and flows into each of the sub-spaces 23a to 23e that constitute the liquid-side internal space 23 of the liquid header 40. Specifically, a portion of the refrigerant that has flowed in the distributing pipe 22a flows to the sub-space 23a, a portion of the refrigerant that has flowed in the distributing pipe 22b flows to the sub-space 23b, a portion of the refrigerant that has flowed in the distributing pipe 22c flows to the sub-space 23c, a portion of the refrigerant that has flowed in the distributing pipe 22d flows to the sub-space 23d, and a portion of the refrigerant that has flowed in the distributing pipe 22e flows to the sub-space 23e. The portions of the refrigerant that have flowed into the respective sub-spaces 23a to 23e of the liquid-side internal space 23 flow to the corresponding flat tubes 28 connected to a corresponding one of the sub-spaces 23a to 23e. The portions of the refrigerant flowing in the respective flat tubes 28 exchange heat with air and thus evaporate and become portions of a gas-phase refrigerant, and flow into the gas-side internal space 25 of the gas header 70 to merge with each other.

When the air conditioner 1 performs a cooling operation or a defrost operation, the refrigerant flows in the refrigerant circuit 6 in a direction opposite to that when the air conditioner 1 performs the heating operation. Specifically, a high-temperature gas-phase refrigerant flows into the gas-side internal space 25 of the gas header 70 via the main gas-refrigerant pipe connection portion 19a and the branch gas-refrigerant pipe connection portion 19b of the gas-refrigerant pipe 19. The refrigerant that has flowed into the gas-side internal space 25 of the gas header 70 is divided and flows into each flat tube 28. Portions of the refrigerant that have flowed into the flat tubes 28 exchange heat with air and dissipate heat or are condensed, become portions of a liquid refrigerant or a gas-liquid two-phase refrigerant, and flow into a corresponding one of the sub-spaces 23a to 23e of the liquid-side internal space 23 of the liquid header 40. The portions of the refrigerant that have flowed into the sub-spaces 23a to 23e of the liquid-side internal space 23 merge at the distributor 22 and flow out to the liquid-refrigerant pipe 20.

(4) Details of Gas Header

Figure 6:
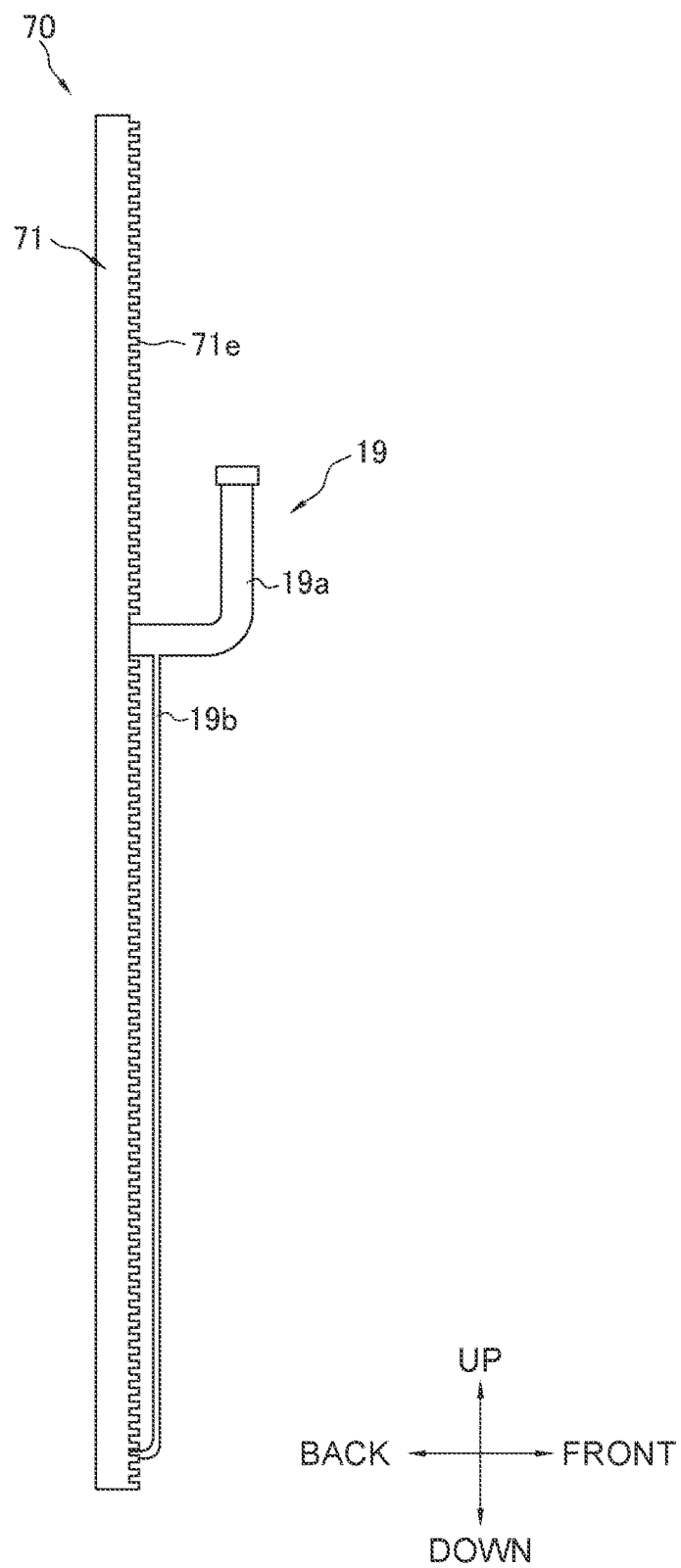
FIG. 6 is a side external structural view showing a state of connection of a gas-refrigerant pipe to a gas header according to one or more embodiments.
Figure 7:
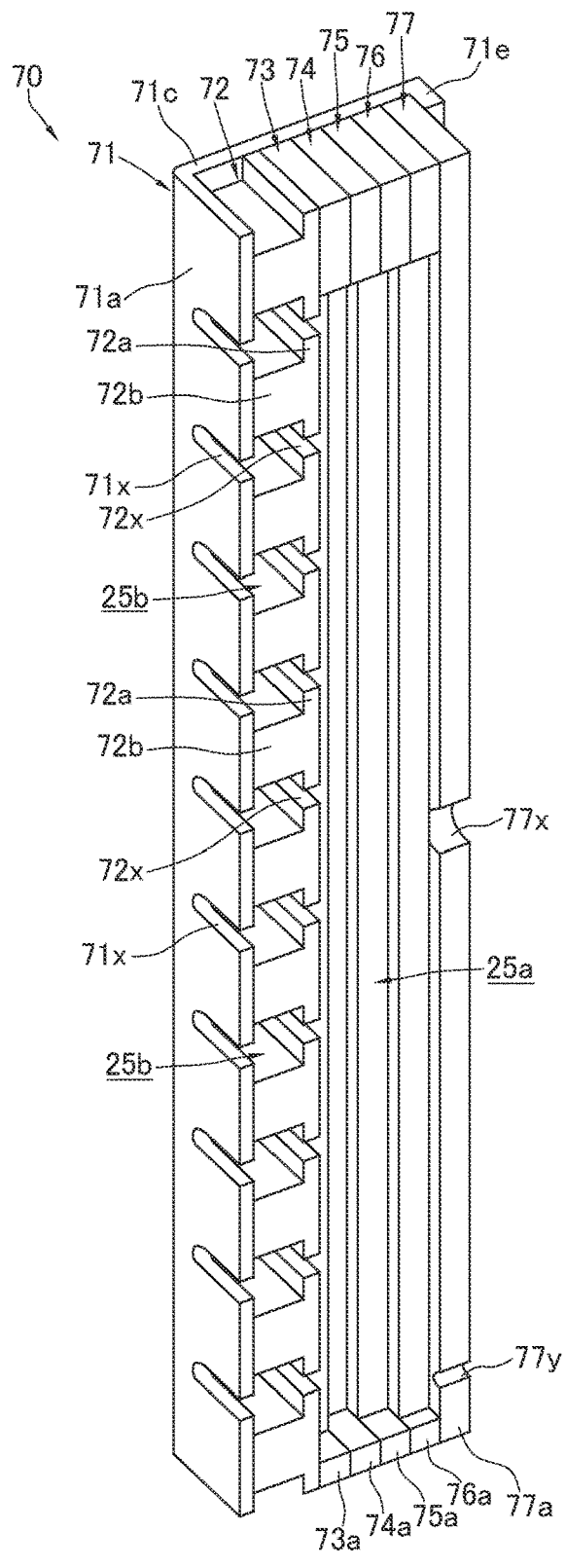
FIG. 7 is a sectional perspective view of the gas header according to one or more embodiments.
Figure 7:
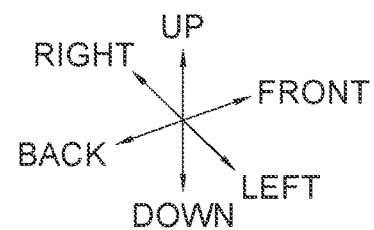
Figure 8:
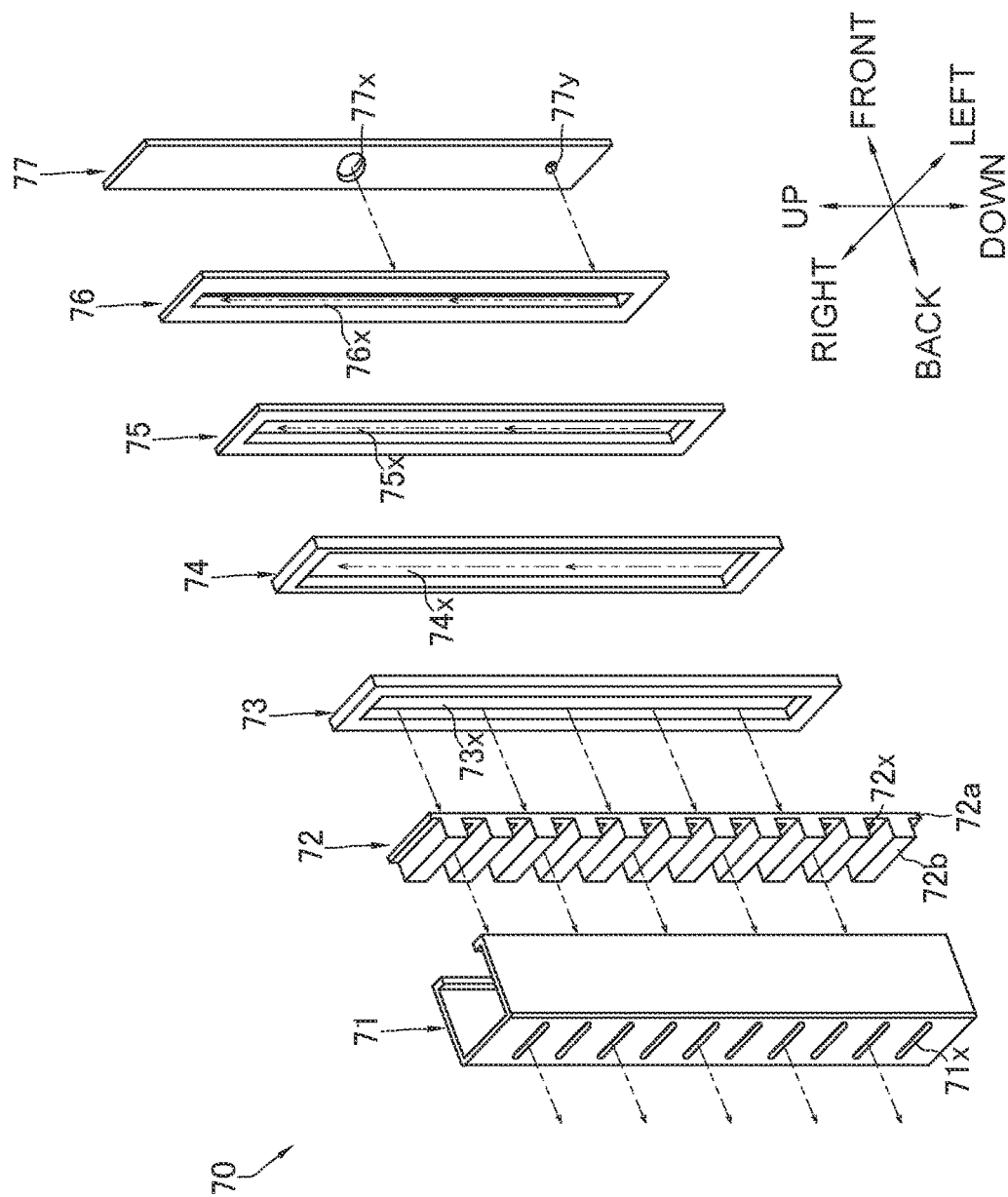
FIG. 8 is an exploded perspective view of the gas header according to one or more embodiments.
Figure 9:
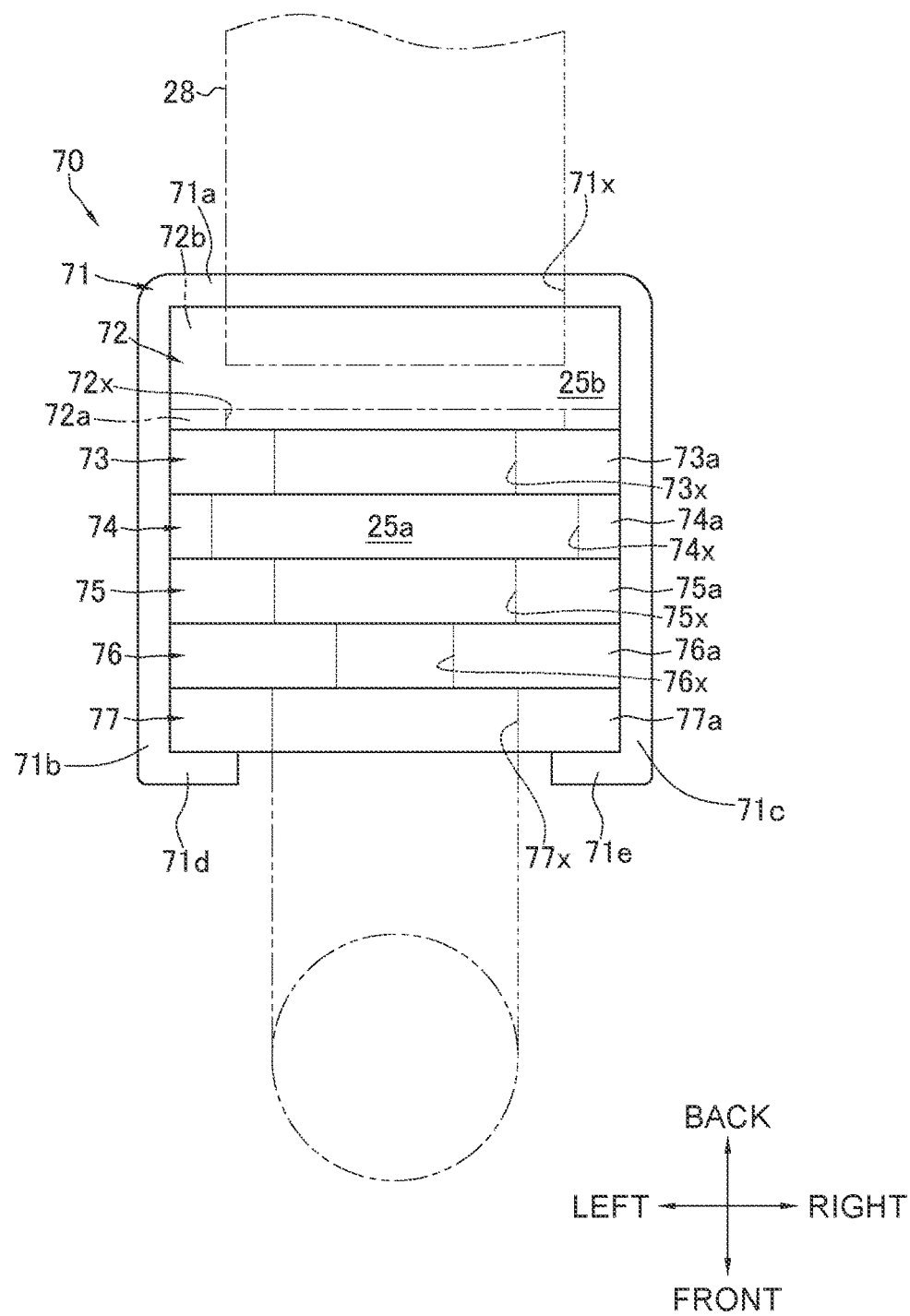
FIG. 9 is a plan sectional view of the gas header according to one or more embodiments.

FIG. 6 is a side external structural view showing a state of connection of the gas-refrigerant pipe 19 to the gas header 70. FIG. 7 is a sectional perspective view in which the gas header 70 has been sectioned at the center in a left-right direction. FIG. 8 is an exploded perspective view of the gas header 70. Note that, in FIG. 8, alternate-long-and-two-short-dash-line arrows indicate the flow of a refrigerant when the outdoor heat exchanger 11 functions as a heat dissipater or a condenser of the refrigerant. FIG. 9 is a plan sectional view showing a state of connection of the gas-refrigerant pipe 19 and the flat tubes 28 to the gas header 70.

Figure 10:
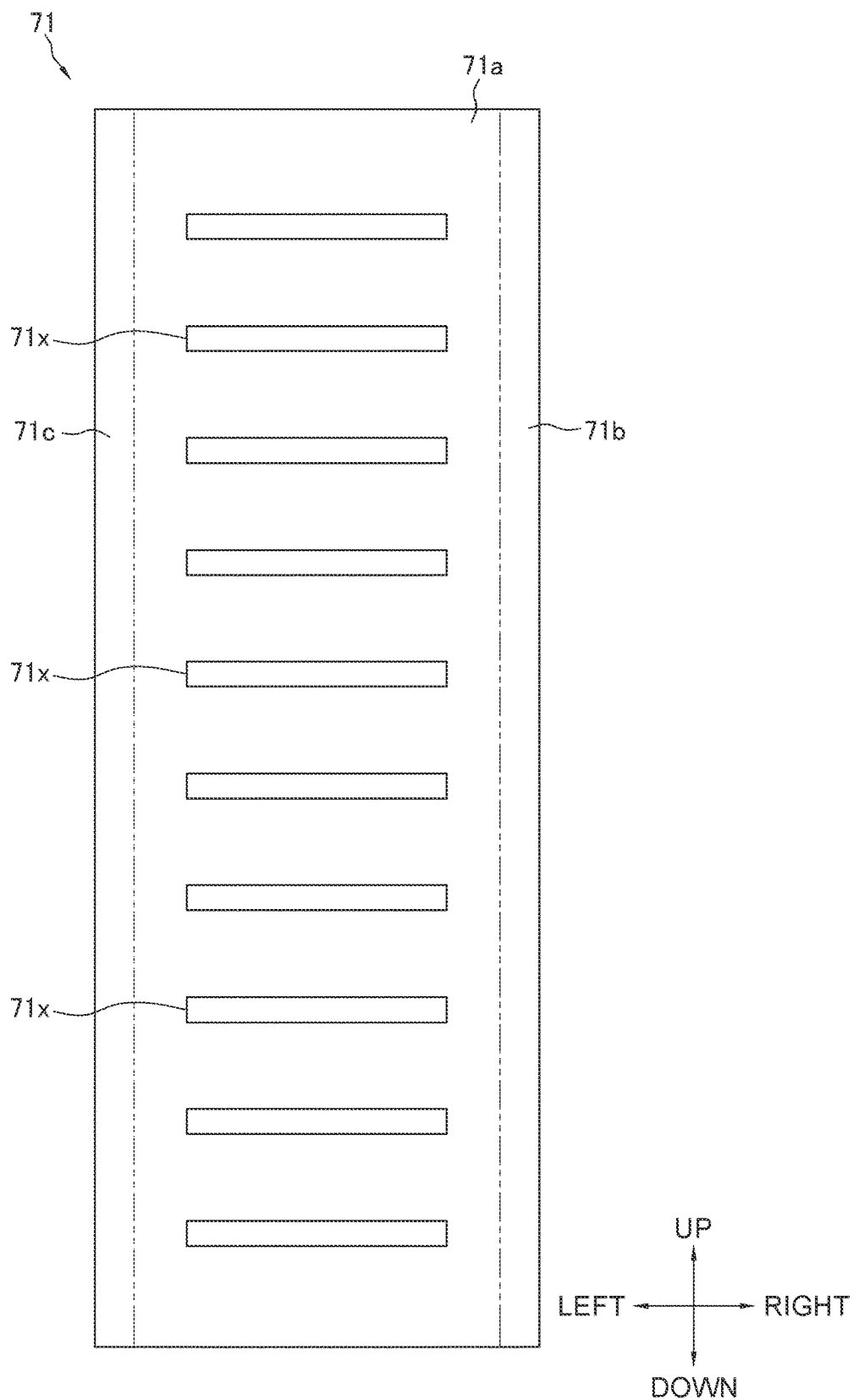
FIG. 10 is a schematic view of a first member according to one or more embodiments when seen from the front thereof.
Figure 11:
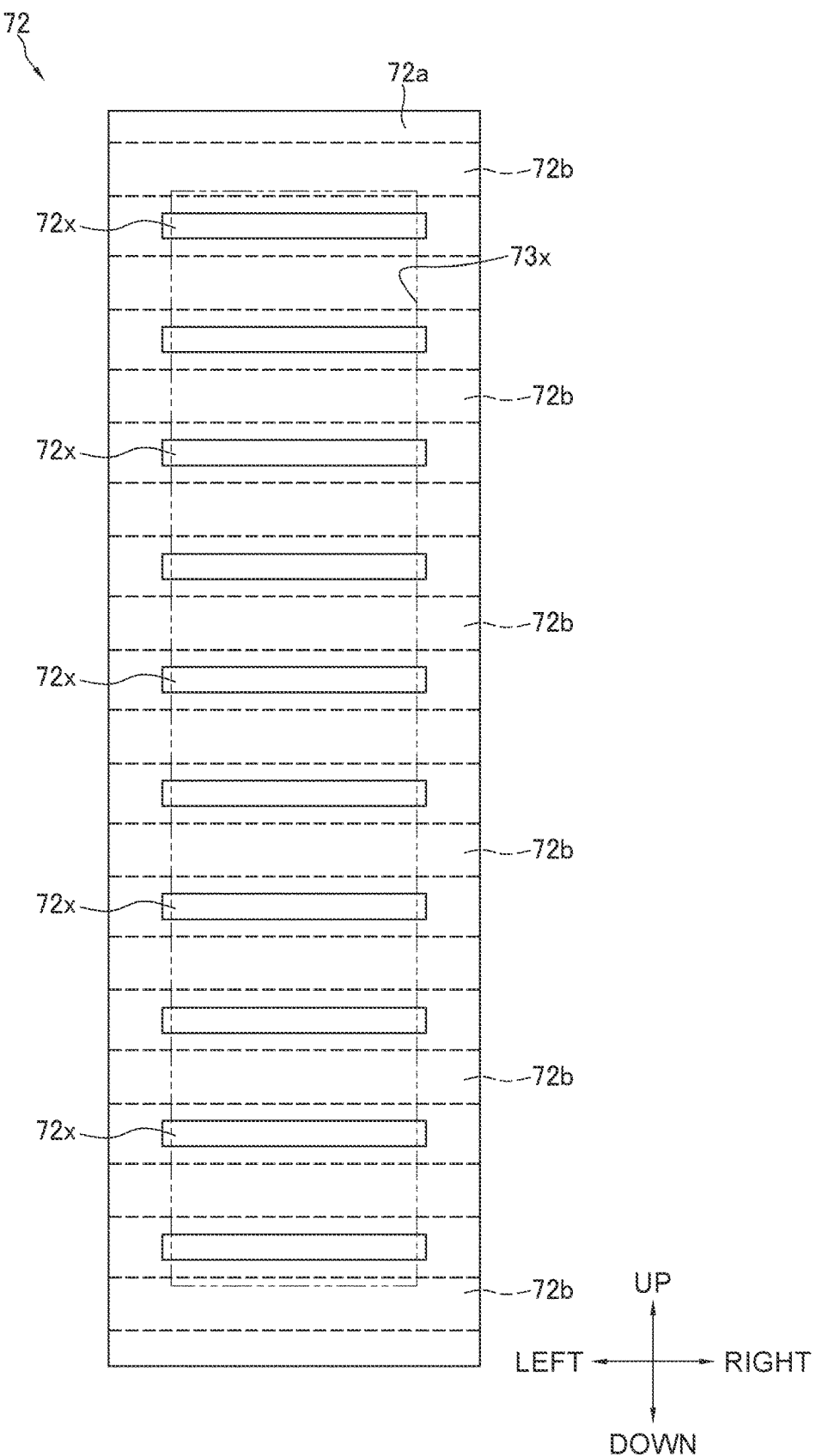
FIG. 11 is a schematic view of a second member according to one or more embodiments when seen from the front thereof.
Figure 12:
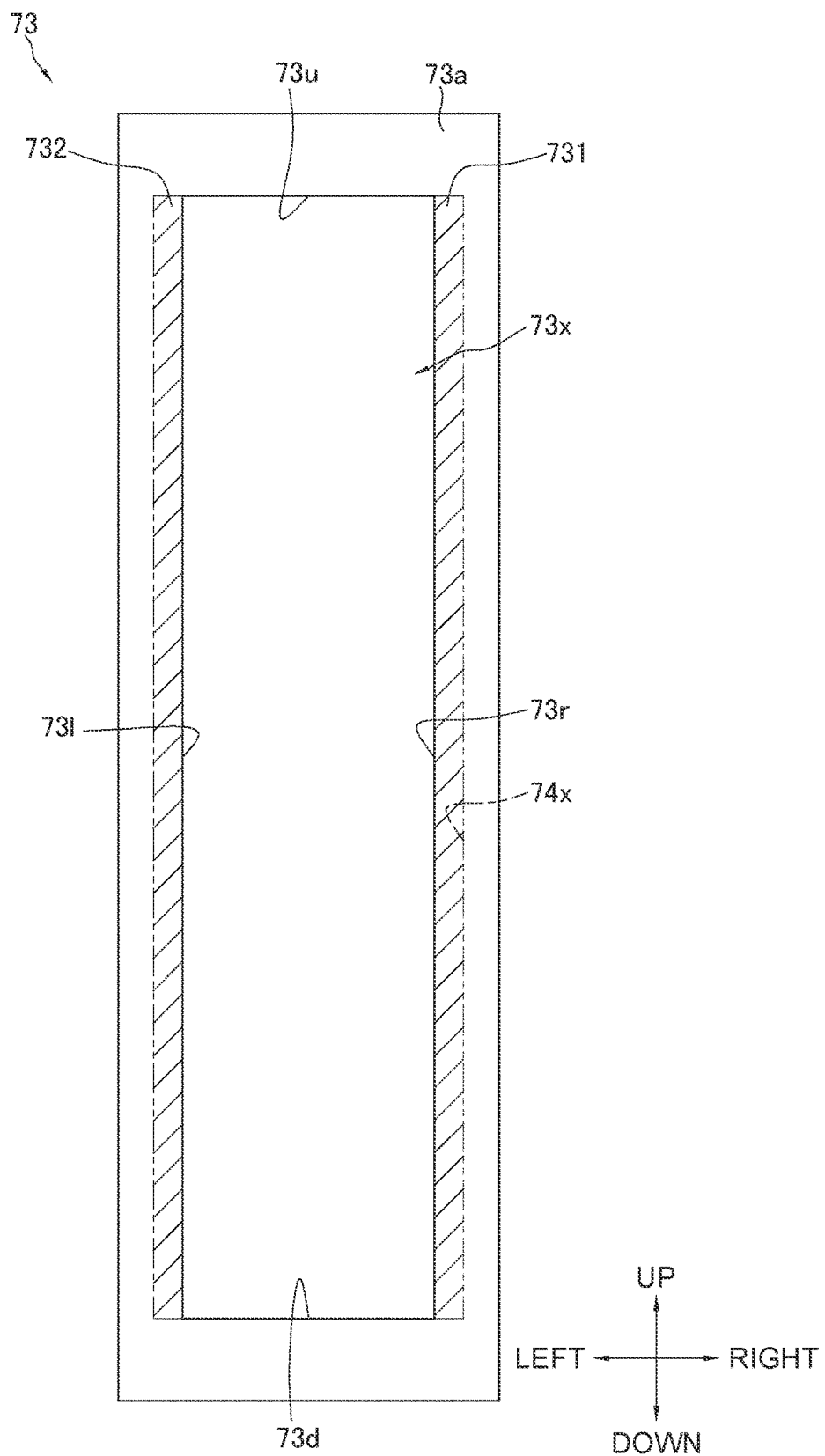
FIG. 12 is a schematic view of a third member according to one or more embodiments when seen from the front thereof.
Figure 13:
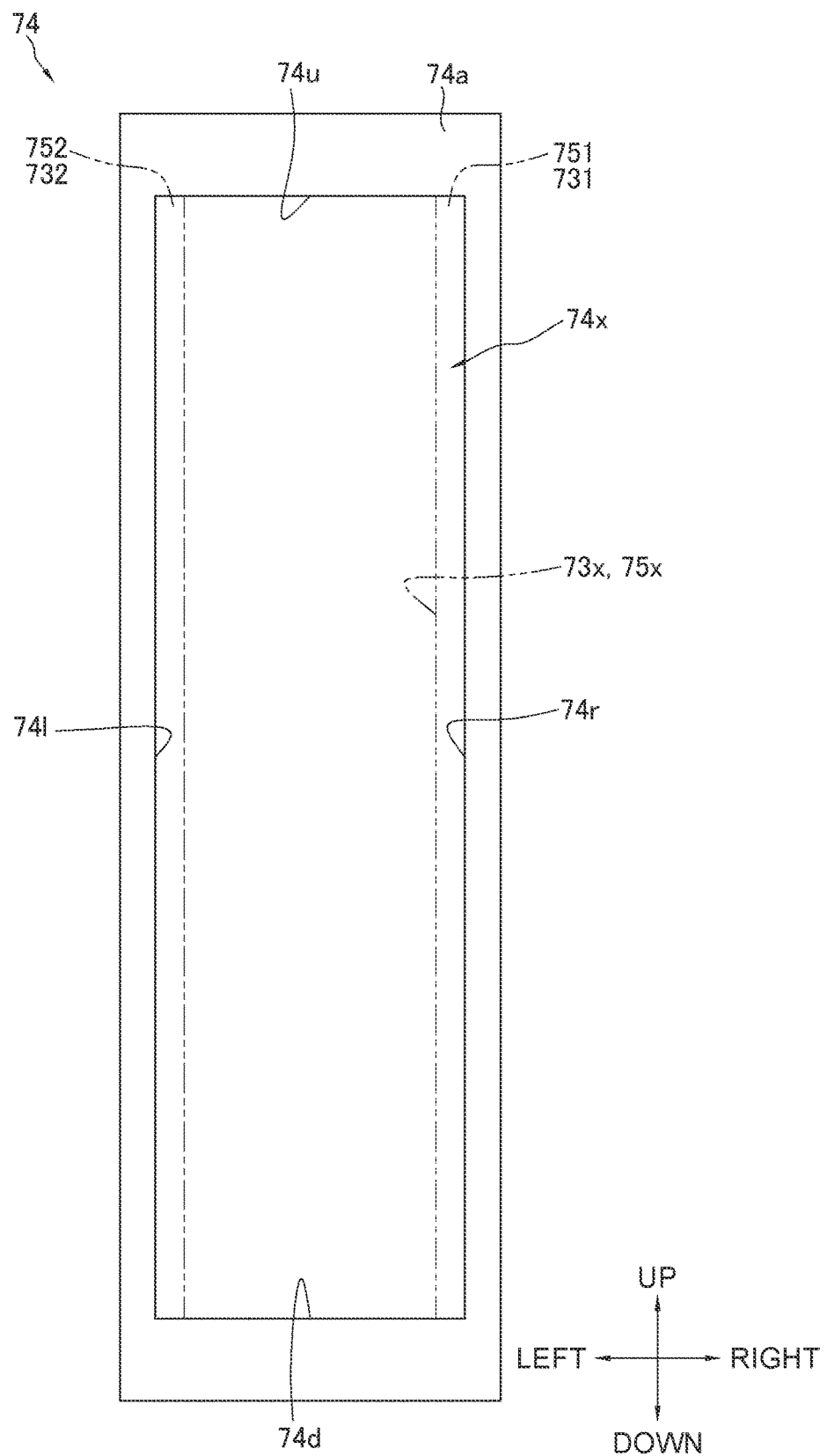
FIG. 13 is a schematic view of a fourth member according to one or more embodiments when seen from the front thereof.
Figure 14:
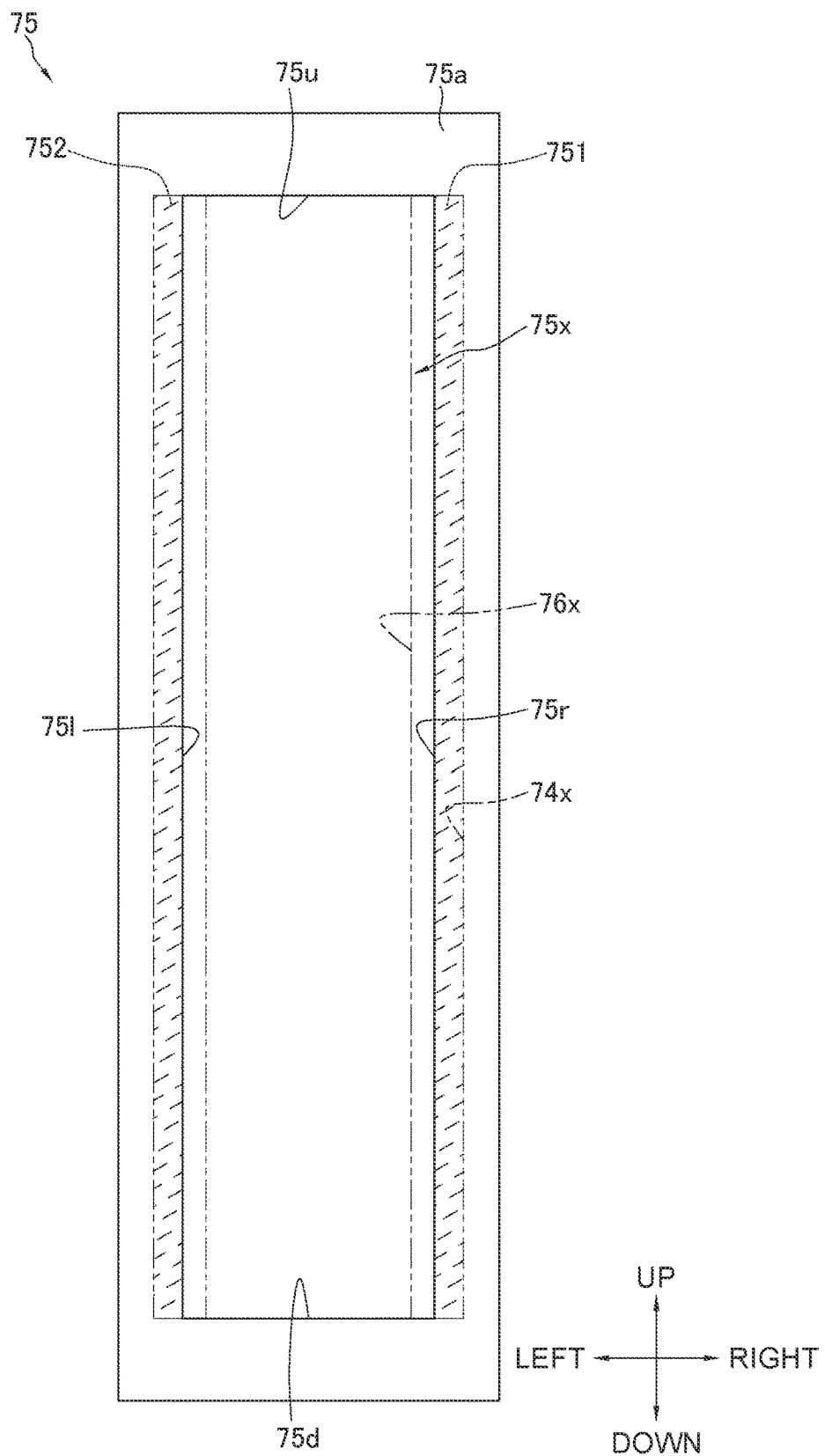
FIG. 14 is a schematic view of a fifth member according to one or more embodiments when seen from the front thereof.
Figure 15:
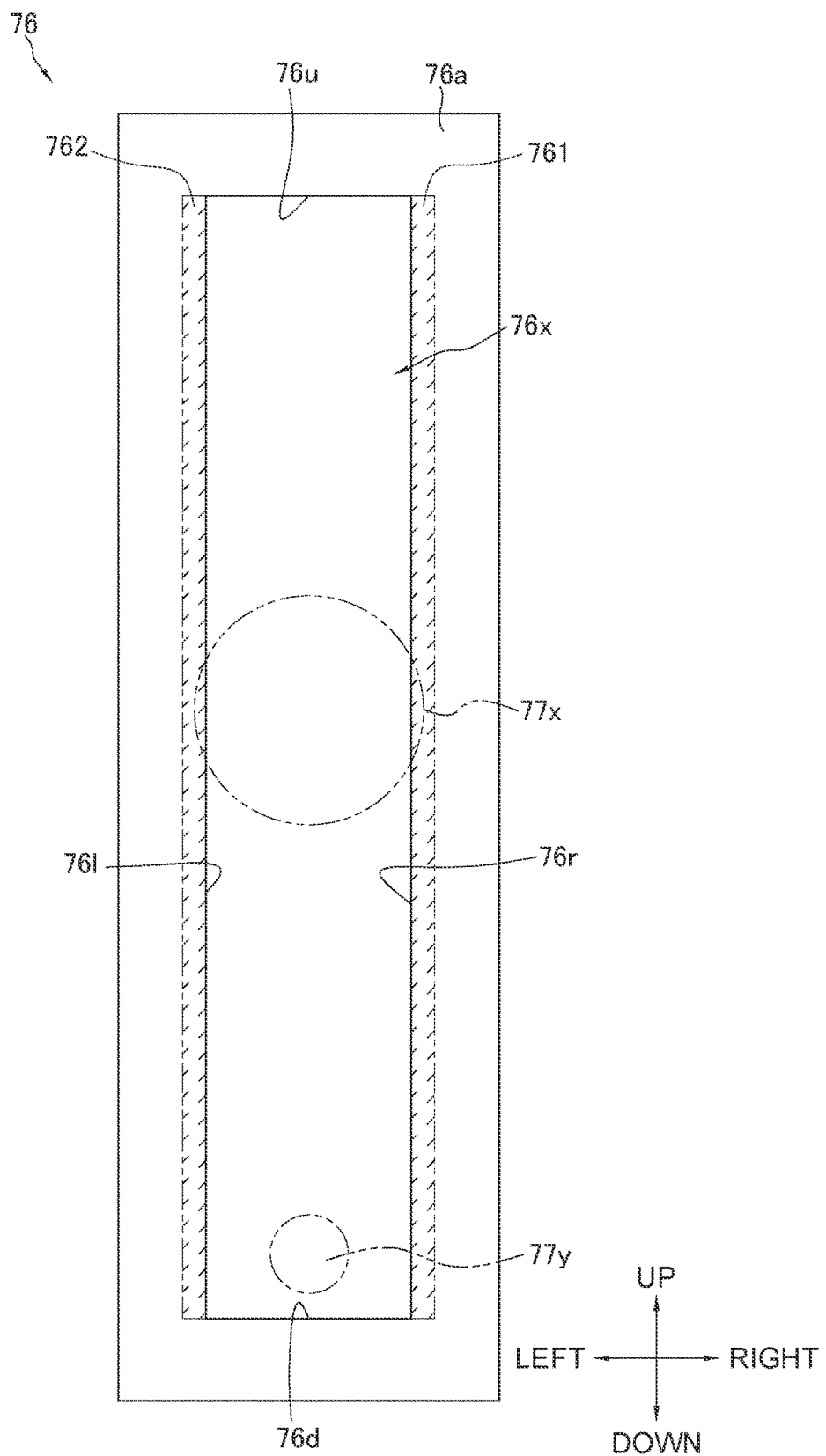
FIG. 15 is a schematic view of a sixth member according to one or more embodiments when seen from the front thereof.
Figure 16:
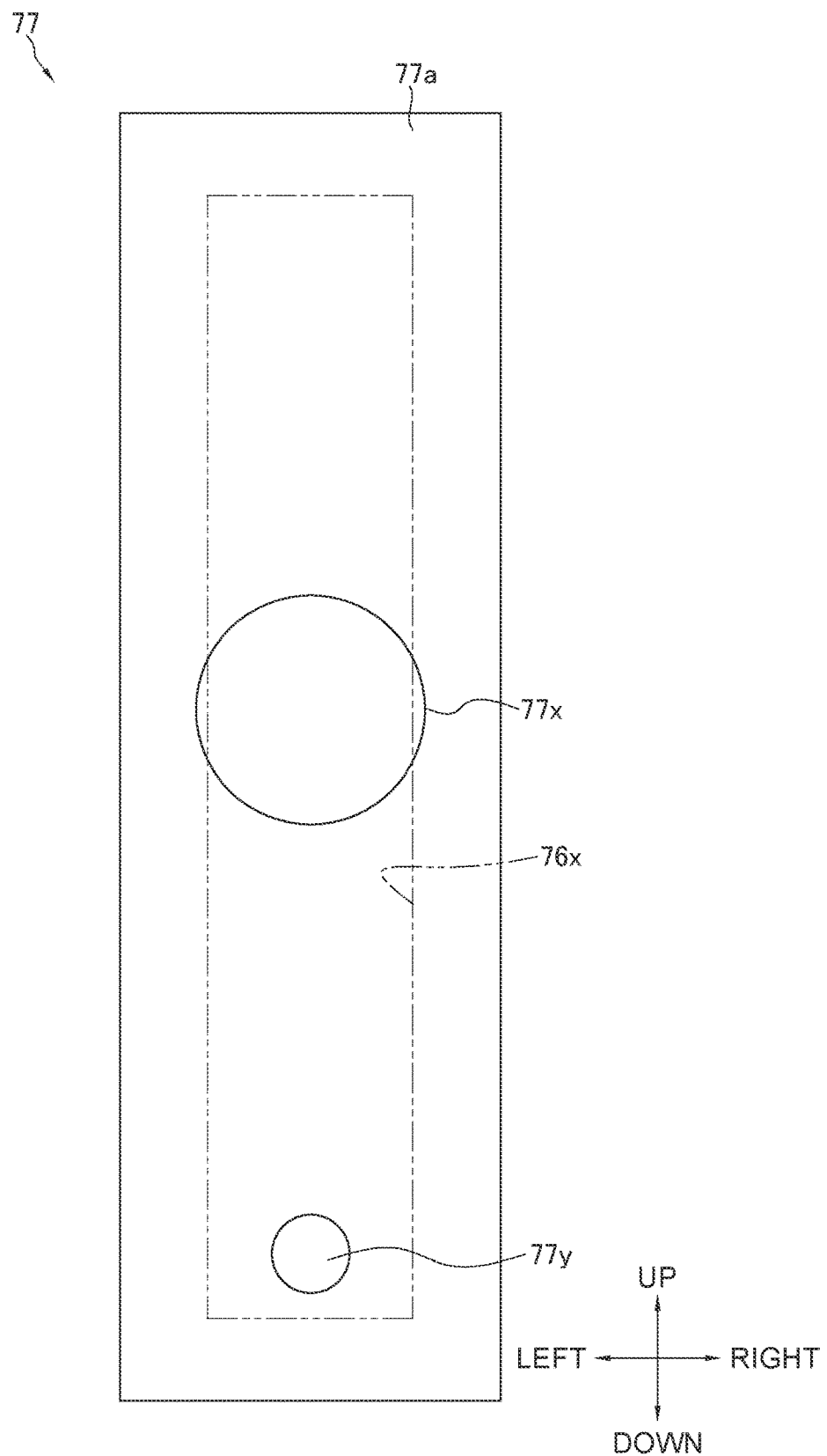
FIG. 16 is a schematic view of a seventh member according to one or more embodiments when seen from the front thereof.

FIG. 10 is a schematic view of a first member 71 when seen from a front side thereof (a first claw portion 71d and a second claw portion 71e are not shown). FIG. 11 is a schematic view of a second member 72 when seen from a front side thereof. FIG. 12 is a schematic view of a third member 73 when seen from a front side thereof. FIG. 13 is a schematic view of a fourth member 74 when seen from a front side thereof. FIG. 14 is a schematic view of a fifth member 75 when seen from a front side thereof. FIG. 15 is a schematic view of a sixth member 76 when seen from a front side thereof. FIG. 16 is a schematic view of a seventh member 77 when seen from a front side thereof. Note that, in each of these figures, there are portions shown by, for example, broken lines, while the relationship between the positions of openings of members that are disposed adjacent to each other is projected.

The gas header 70 includes a first member 71, a second member 72, a third member 73, a fourth member 74, a fifth member 75, a sixth member 76, and a seventh member 77. The gas header 70 is constituted by joining the first member 71, the second member 72, the third member 73, the fourth member 74, the fifth member 75, the sixth member 76, and the seventh member 77 to each other by brazing. Note that, although not specified, in one or more embodiments, for example, the first member 71, the third member 73, the fifth member 75, and the seventh member 77 can each be a member in which an aluminum-alloy plate material is provided with a cladding layer including a brazing material on each of two surfaces in a plate-thickness direction; and the second member 72, the fourth member 74, and the sixth member 76 can each be an aluminum-alloy plate material. In this way, by forming a structure in which a plate material that does not include a cladding layer is sandwiched by plate materials that include a cladding layer, it is possible to sufficiently join the members to each other by brazing.

Note that, from the viewpoint that the first member 71, the third member 73, the fourth member 74, the fifth member 75, the sixth member 76, and the seventh member 77 can easily have their openings formed by a pressing operation in a plate-thickness direction, it is desirable that these members be constituted to have plate thicknesses that are 3 mm or less. It is desirable that the first member 71, the third member 73, the fourth member 74, the fifth member 75, the sixth member 76, and the seventh member 77 each be a member having a thickness in the plate-thickness direction that is smaller than a length in a vertical direction and that is smaller than a length in the left-right direction. The first member 71, the third member 73, the fourth member 74, the fifth member 75, the sixth member 76, and the seventh member 77 are stacked in a stacking direction, which is the plate-thickness direction.

An external shape of the gas header 70 in plan view is a substantially square shape having the connection portions of the flat tubes 28 as one side.

(4-1) First Member

The first member 71 is primarily a member that, together with the seventh member 77 described below, constitutes the periphery of the external shape of the gas header 70.

The first member 71 includes a flat-tube connection plate 71a, a first outer wall 71b, a second outer wall 71c, the first claw portion 71d, and the second claw portion 71e.

Although not limited, the first member 71 of one or more embodiments can be formed by bending one metal plate obtained by rolling with the longitudinal direction of the gas header 70 being a direction of fold. In this case, the plate thickness of each portion of the first member 71 is uniform.

The flat-tube connection plate 71a is a flat-shaped portion extending in the up-down direction and in the left-right direction. A plurality of flat-tube connection openings 71x arranged in the up-down direction are formed in the flat-tube connection plate 71a. Each flat-tube connection opening 71x is a penetration opening in a thickness direction of the flat-tube connection plate 71a. With the flat tubes 28 being inserted in the flat-tube connection openings 71x such that one end of each flat tube 28 extends completely through the corresponding flat-tube connection opening 71x, the flat tubes 28 are joined to the flat-tube connection openings 71x by brazing. Here, each flat tube 28 is mounted on a main surface of the flat-tube connection plate 71a with a longitudinal direction of each flat tube 28 being orthogonal to the main surface. In the joined state realized by brazing, the entire inner peripheral surface of each flat-tube connection opening 71x and the entire outer peripheral surface of the corresponding flat tube 28 are in contact with each other. Here, since the thickness of the first member 71 including the flat-tube connection plate 71a is relatively small, such as on the order of 1.0 mm or greater and 2.0 mm or less, the length of the inner peripheral surface of each flat-tube connection opening 71x in the plate-thickness direction can be small. Therefore, when, in a stage before the joining by brazing, the flat tubes 28 are inserted into the flat-tube connection openings 71x, friction that is produced between the inner peripheral surfaces of the flat-tube connection openings 71x and the outer peripheral surfaces of the flat tubes 28 can be kept low, and the insertion operation can be facilitated.

The first outer wall 71b is a planar-shaped portion extending toward a front side from a front surface of an end portion on a left side (side of the liquid header 40) of the flat-tube connection plate 71a. The second outer wall 71c is a planar-shaped portion extending toward a front side from a front surface of an end portion on a right side (side opposite to the liquid header 40) of the flat-tube connection plate 71a. The first outer wall 71b and the second outer wall 71c sandwich the second member 72, the third member 73, the fourth member 74, the fifth member 75, the sixth member 76, and the seventh member 77 from the left-right direction.

The first claw portion 71d is a portion extending toward the right from a front end portion of the first outer wall 71b. The second claw portion 71e is a portion extending toward the left from a front end portion of the second outer wall 71c.

In a state before the second member 72, the third member 73, the fourth member 74, the fifth member 75, the sixth member 76, and the seventh member 77 are disposed on an inner side of the first member 71 in plan view, the first claw portion 71d and the second claw portion 71e are each in an extended state on an extension line of a corresponding one of the first outer wall 71b and the second outer wall 71c. In a state in which the second member 72, the third member 73, the fourth member 74, the fifth member 75, the sixth member 76, and the seventh member 77 are disposed on the inner side of the first member 71 in plan view, the first claw portion 71d and the second claw portion 71e are bent toward each other to crimp the second member 72, the third member 73, the fourth member 74, the fifth member 75, the sixth member 76, and the seventh member 77 by the first member 71, as a result of which they are fixed to each other. When, in this state, the brazing is performed, for example, inside a furnace, the members are joined to each other by the brazing and are completely fixed to each other.

(4-2) Second Member

The second member 72 includes a plate-shaped base portion 72a and a plurality of protrusions 72b that protrude toward the flat-tube connection plate 71a from the base portion 72a.

The base portion 72a extends parallel to the flat-tube connection plate 71a and has a plate shape in which the direction of extension of the flat tubes 28 from the gas header 70 is the plate-thickness direction. The width of the base portion 72a in the left-right direction is the same as the width of a portion of the flat-tube connection plate 71a in the left-right direction excluding two end portions. A plurality of distributing openings 72x provided side by side in the up-down direction are formed in a one-to-one correspondence with the flat tubes 28 at positions in the base portion 72a other than the positions where the protrusions 72b are provided. When viewed from the front, the distributing openings 72x have shapes that are substantially the same as those of the end portions of the flat tubes 28.

The protrusions 72b extend in the horizontal direction up to where they come into contact with a front surface of the flat-tube connection plate 71a by extending toward the back from portions of the base portion 72a between the distributing openings 72x adjacent to each other. Therefore, there are formed insertion spaces 25b surrounded by the front surface of the flat-tube connection plate 71a of the first member 71, the first outer wall 71b and the second outer wall 71c of the first member 71, the protrusions 72b of the second member 72 that are adjacent to each other in the up-down direction, and portions of a back surface of the base portion 72a of the second member 72 other than the distributing openings 72x. The insertion spaces 25b are provided side by side in the longitudinal direction of the gas header 70. End portions of the flat tubes 28 are positioned in the corresponding insertion spaces 25b, and the insertion spaces 25b function as chambers for a refrigerant that flows out toward the flat tubes 28. Note that the lengths of the protrusions 72b in the front-back direction are adjusted to be larger than the plate thickness of the first member 71, the third member 73, the fourth member 74, the fifth member 75, the sixth member 76, and the seventh member 77 that constitute the gas header 70. Therefore, even if an error occurs in the amount of insertion of the flat tubes 28 into the gas header 70, as long as the error is within a range of the lengths of the protrusions 72b in the front-back direction, conditions such as there being portions at which a flow of a refrigerant is blocked or portions at which a refrigerant has difficulty flowing when the gas header 70 has been completed are less likely to occur. It is also possible to suppress a brazing material from moving due to a capillary action when the members are joined by brazing, and to thus suppress the brazing material from closing the refrigerant passages 28b of the flat tubes 28.

Note that the gas-side internal space 25 of the gas header 70 includes the insertion spaces 25b, which are space portions disposed more toward the flat tubes 28 than the base portion 72a, and a distributing space 25a, which is a space portion disposed farther than the base portion 72a on a side opposite to the flat tubes 28.

(4-3) Third Member

The third member 73 is a plate-shaped member that is stacked on a surface on a front side (side at which the gas-refrigerant pipe 19 and the gas header 70 are connected to each other) of the base portion 72a of the second member 72 so as to face and contact this surface.

The third member 73 (an example of the third member) includes a third internal plate 73a and a third internal opening 73x (an example of the third opening).

The third internal plate 73a has a flat shape extending in the up-down direction and in the left-right direction. The third internal plate 73a has a left-right width and an up-down width that are the same as those of the base portion 72a of the second member 72.

The third internal opening 73x is a penetration opening in the plate-thickness direction of the third internal plate 73a. It is desirable that the third internal opening 73x be formed by punching a plate-shaped member. In one or more embodiments, the third internal opening 73x is formed with a large size near the center of the third internal plate 73a in the up-down direction and in the left-right direction. A longitudinal direction of the third internal opening 73x is the up-down direction, and, when viewed from the front, is a rectangular opening. When viewed from the front, the third internal opening 73x overlaps a part of each distributing opening 72x of the second member 72 and communicates therewith. Note that the width of the third internal opening 73x in the left-right direction is smaller than the width of each distributing opening 72x of the second member 72 in the left-right direction, and that, when viewed from the front, two ends of the third internal opening 73x in the left-right direction are positioned inward of two ends of each distributing opening 72x of the second member 72 in the left-right direction. Therefore, a refrigerant that flows in the distributing space 25a can be made to flow by being branched toward the plurality of distributing openings 72x of the second member 72, and the flow of the refrigerant can be divided with respect to each flat tube 28 connected to a corresponding one of the distributing openings 72x.

The third internal opening 73x includes a third upper edge surface 73u, a third lower edge surface 73d, a third left edge surface 73l, and a third right edge surface 73r, which serve as rims at an inner periphery of the opening.

A back surface of the third internal plate 73a is in surface-contact with a front surface of the base portion 72a of the second member 72. A part of a front surface of the third internal plate 73a is in surface-contact with a back surface of a fourth internal plate 74a (described below), and the other portions of the front surface of the third internal plate 73a that are not in surface-contact with the back surface of the fourth internal plate 74a are a third left exposed surface 732 and a third right exposed surface 731 that face backward. The third left exposed surface 732 is a surface that, at a portion of the front surface of the third internal plate 73a that is disposed more toward the left than the third left edge surface 731 of the third internal opening 73x, extends in the up-down direction along the third left edge surface 731. The third right exposed surface 731 is a surface that, at a portion of the front surface of the third internal plate 73a that is disposed more toward the right than the third right edge surface 73r of the third internal opening 73x, extends in the up-down direction along the third right edge surface 73r. In one or more embodiments, the width of the third left exposed surface 732 in the left-right direction and the width of the third right exposed surface 731 in the left-right direction may be the same, and are desirably ⅓ or greater and 3 times or less of the plate thickness of the third member 73.

(4-4) Fourth Member

The fourth member 74 is a plate-shaped member that is stacked on the surface on a front side (side at which the gas-refrigerant pipe 19 and the gas header 70 are connected to each other) of the third internal plate 73a of the third member 73 so as to face and contact this surface.

The fourth member 74 (an example of the second member) includes a fourth internal plate 74a and a fourth internal opening 74x.

The fourth internal plate 74a has a flat shape extending in the up-down direction and in the left-right direction. Similarly to the third internal plate 73a, the fourth internal plate 74a has a left-right width and an up-down width that are the same as those of the base portion 72a of the second member 72.

The fourth internal opening 74x is a penetration opening in the plate-thickness direction of the fourth internal plate 74a. It is desirable that the fourth internal opening 74x be formed by punching a plate-shaped member. In one or more embodiments, the fourth internal opening 74x is formed with a large size near the center of the fourth internal plate 74a in the up-down direction and in the left-right direction. A longitudinal direction of the fourth internal opening 74x is the up-down direction, and, when viewed from the front, is a rectangular opening. When viewed from the front, the fourth internal opening 74x overlaps a part of the third internal opening 73x of the third member 73 and communicates therewith. Note that the width of the fourth internal opening 74x in the left-right direction is larger than the width of the third internal opening 73x of the third member 73 in the left-right direction, and that, when viewed from the front, two ends of the fourth internal opening 74x in the left-right direction are positioned outward of the two ends of the third internal opening 73x in the left-right direction.

The fourth internal opening 74x includes a fourth upper edge surface 74u, a fourth lower edge surface 74d, a fourth left edge surface 741, and a fourth right edge surface 74r, which serve as rims at an inner periphery of the opening.

When viewed from the front, the fourth upper edge surface 74u overlaps the third upper edge surface 73u, and the fourth lower edge surface 74d overlaps the third lower edge surface 73d.

The back surface of the fourth internal plate 74a is in surface-contact with portions, other than the third left exposed surface 732 and the third right exposed surface 731, of the front surface of the third internal plate 73a of the third member 73. A front surface of the fourth internal plate 74a is in surface-contact with a part of a back surface of the fifth internal plate 75a (described below).

(4-5) Fifth Member

The fifth member 75 is a plate-shaped member that is stacked on the surface on a front side (side at which the gas-refrigerant pipe 19 and the gas header 70 are connected to each other) of the fourth internal plate 74a of the fourth member 74 so as to face and contact this surface.

The fifth member 75 (an example of the first member) includes a fifth internal plate 75a and a fifth internal opening 75x (an example of the first opening).

The fifth internal plate 75a has a flat shape extending in the up-down direction and in the left-right direction. Similarly to the third internal plate 73a and the fourth internal plate 74a, the fifth internal plate 75a has a left-right width and an up-down width that are the same as those of the base portion 72a of the second member 72.

The fifth internal opening 75x is a penetration opening in the plate-thickness direction of the fifth internal plate 75a. It is desirable that the fifth internal opening 75x be formed by punching a plate-shaped member. In one or more embodiments, the fifth internal opening 75x is formed with a large size near the center of the fifth internal plate 75a in the up-down direction and in the left-right direction. A longitudinal direction of the fifth internal opening 75x is the up-down direction, and, when viewed from the front, is a rectangular opening. When viewed from the front, the fifth internal opening 75x overlaps a part of the fourth internal opening 74x of the fourth member 74 and communicates therewith. Note that the width of the fifth internal opening 75x in the left-right direction is smaller than the width of the fourth internal opening 74x of the fourth member 74 in the left-right direction, and that, when viewed from the front, two ends of the fifth internal opening 75x in the left-right direction are positioned inward of the two ends of the fourth internal opening 74x in the left-right direction.

The fifth internal opening 75x includes a fifth upper edge surface 75u, a fifth lower edge surface 75d, a fifth left edge surface 751, and a fifth right edge surface 75r, which serve as rims at an inner periphery of the opening.

When viewed from the front, the fifth upper edge surface 75u overlaps the fourth upper edge surface 74u, and the fifth lower edge surface 75d overlaps the fourth lower edge surface 74d.

Note that, in one or more embodiments, when viewed from the front, the fifth left edge surface 751 overlaps the third left edge surface 731, and the fifth right edge surface 75r overlaps the third right edge surface 73r.

A part of the back surface of the fifth internal plate 75a is in surface-contact with the front surface of the fourth internal plate 74a. Other portions of the back surface of the fifth internal plate 75a that are not in surface-contact with the front surface of the fourth internal plate 74a are a fifth left exposed surface 752 and a fifth right exposed surface 751 that face backward. The fifth left exposed surface 752 is a surface that, at a portion of the back surface of the fifth internal plate 75a that is disposed more toward the left than the fifth left edge surface 751 of the fifth internal opening 75x, extends in the up-down direction along the fifth left edge surface 751. The fifth right exposed surface 751 is a surface that, at a portion of the back surface of the fifth internal plate 75a that is disposed more toward the right than the fifth right edge surface 75r of the fifth internal opening 75x, extends in the up-down direction along the fifth right edge surface 75r. In one or more embodiments, the width of the fifth left exposed surface 752 in the left-right direction and the width of the fifth right exposed surface 751 in the left-right direction may be the same, and are desirably ⅓ or greater and 3 times or less of the plate thickness of the fifth member 75.

Note that a front surface of the fifth internal plate 75a is in surface-contact with a part of a back surface of the sixth internal plate 76a (described below).

(4-6) Sixth Member

The sixth member 76 is a plate-shaped member that is stacked on the surface on a front side (side at which the gas-refrigerant pipe 19 and the gas header 70 are connected to each other) of the fifth internal plate 75a of the fifth member 75 so as to face and contact this surface.

The sixth member 76 includes a sixth internal plate 76a and a sixth internal opening 76x.

The sixth internal plate 76a has a flat shape extending in the up-down direction and in the left-right direction. Similarly to the third internal plate 73a, the fourth internal plate 74a, and the fifth internal plate 75a, the sixth internal plate 76a has a left-right width and an up-down width that are the same as those of the base portion 72a of the second member 72.

The sixth internal opening 76x is a penetration opening in the plate-thickness direction of the sixth internal plate 76a. It is desirable that the sixth internal opening 76x be formed by punching a plate-shaped member. In one or more embodiments, the sixth internal opening 76x is formed with a large size near the center of the sixth internal plate 76a in the up-down direction and in the left-right direction. A longitudinal direction of the sixth internal opening 76x is the up-down direction, and, when viewed from the front, is a rectangular opening. When viewed from the front, the sixth internal opening 76x overlaps a part of the fifth internal opening 75x of the fifth member 75 and communicates therewith. Note that the width of the sixth internal opening 76x in the left-right direction is smaller than the width of the fifth internal opening 75x of the fifth member 75 in the left-right direction, and that, when viewed from the front, two ends of the sixth internal opening 76x in the left-right direction are positioned inward of the two ends of the fifth internal opening 75x in the left-right direction.

The sixth internal opening 76x includes a sixth upper edge surface 76u, a sixth lower edge surface 76d, a sixth left edge surface 761, and a sixth right edge surface 76r, which serve as rims at an inner periphery of the opening.

When viewed from the front, the sixth upper edge surface 76u overlaps the fifth upper edge surface 75u, and the sixth lower edge surface 76d overlaps the fifth lower edge surface 75d.

A part of the back surface of the sixth internal plate 76a is in surface-contact with the front surface of the fifth internal plate 75a. Other portions of the back surface of the sixth internal plate 76a that are not in surface-contact with the front surface of the fifth internal plate 75a are a sixth left exposed surface 762 and a sixth right exposed surface 761 that face backward. The sixth left exposed surface 762 is a surface that, at a portion of the back surface of the sixth internal plate 76a that is disposed more toward the left than the sixth left edge surface 761 of the sixth internal opening 76x, extends in the up-down direction along the sixth left edge surface 761. The sixth right exposed surface 761 is a surface that, at a portion of the back surface of the sixth internal plate 76a that is disposed more toward the right than the sixth right edge surface 76r of the sixth internal opening 76x, extends in the up-down direction along the sixth right edge surface 76r. In one or more embodiments, the width of the sixth left exposed surface 762 in the left-right direction and the width of the sixth right exposed surface 761 in the left-right direction may be the same, and are desirably ⅓ or greater and 3 times or less of the plate thickness of the sixth member 76.

Note that a front surface of the sixth internal plate 76a is in surface-contact with a part of a back surface of an external plate 77a (described below).

(4-7) Seventh Member

The seventh member 77 is a plate-shaped member that is stacked on the surface on a front side (side at which the gas-refrigerant pipe 19 and the gas header 70 are connected to each other) of the sixth internal plate 76a of the sixth member 76 so as to face and contact this surface.

The seventh member 77 includes the external plate 77a, a main gas-pipe connection opening 77x, and a branch gas-pipe connection opening 77y.

The external plate 77a has a flat shape extending in the up-down direction and in the left-right direction. Similarly to the third internal plate 73a, the fourth internal plate 74a, the fifth internal plate 75a, and the sixth internal plate 76a, the external plate 77a has a left-right width and an up-down width that are the same as those of the base portion 72a of the second member 72. The external plate 77a covers from the front the distributing space 25a of the gas-side internal space 25 of the gas header 70. The plate thickness of the external plate 77a can be the same as the plate thicknesses of internal plates, such as the third internal plate 73a, the fourth internal plate 74a, the fifth internal plate 75a, and the sixth internal plate 76a.

The main gas-pipe connection opening 77x is a penetration opening in the plate-thickness direction near the center of the external plate 77a in the up-down direction and in the left-right direction. When viewed from the front, a large portion of the main gas-pipe connection opening 77x overlaps the sixth internal opening 76x of the sixth member 76 and communicates therewith. Note that the branch gas-pipe connection opening 77y is provided below the main gas-pipe connection opening 77x, and, when viewed from the front, overlaps the sixth internal opening 76x of the sixth member 76 and communicates therewith.

The main gas-pipe connection opening 77x is a circular opening to which an end portion of the main gas-refrigerant pipe-connection portion 19a is connected. The branch gas-pipe connection opening 77y is a circular opening to which an end portion of the branch gas-refrigerant pipe connection portion 19b is connected.

Note that a front surface of the seventh member 77 is in contact with and crimped to the first claw portion 71d and the second claw portion 71e of the first member 71.

(5) Characteristics of Embodiments 5-1

In the gas header 70 of the outdoor heat exchanger 11 of one or more embodiments, the distributing space 25a of the gas-side internal space 25 is formed by the plate-shaped third member 73, the plate-shaped fourth member 74, the plate-shaped fifth member 75, and the plate-shaped sixth member 76. The third internal opening 73x of the third member 73, the fourth internal opening 74x of the fourth member 74, the fifth internal opening 75x of the fifth member 75, and the sixth internal opening 76x of the sixth member 76 are constituted to have different opening widths in the left-right direction. Therefore, portions of adjacent plate-shaped members that do not overlap each other (the third left exposed surface 732, the third right exposed surface 731, the fifth left exposed surface 752, the fifth right exposed surface 751, the sixth left exposed surface 762, the sixth right exposed surface 761) can be formed.

Therefore, the distributing space 25a of the gas-side internal space 25 has a structure that includes, as pressure-receiving surfaces that are subjected to the pressure of a refrigerant in the inside thereof, not only the third upper edge surface 73u, the third lower edge surface 73d, the third left edge surface 731, and the third right edge surface 73r of the third internal opening 73x, the fourth upper edge surface 74u, the fourth lower edge surface 74d, the fourth left edge surface 741, and the fourth right edge surface 74r of the fourth internal opening 74x, the fifth upper edge surface 75u, the fifth lower edge surface 75d, the fifth left edge surface 751, and the fifth right edge surface 75r of the fifth internal opening 75x, and the sixth upper edge surface 76u, the sixth lower edge surface 76d, the sixth left edge surface 761, and the sixth right edge surface 76r of the sixth internal opening 76x, but also the third left exposed surface 732, the third right exposed surface 731, the fifth left exposed surface 752, the fifth right exposed surface 751, the sixth left exposed surface 762, and the sixth right exposed surface 761. Therefore, the pressure of a refrigerant in the distributing space 25a of the gas-side internal space 25 can be dispersed and received at many pressure-receiving surfaces thereof, and the pressure-resistance strength can be increased by dispersing stress.

Since such a mechanism that increases the pressure-resistance strength is used in the gas header 70 of the outdoor heat exchanger 11, even if a high-pressure gas refrigerant discharged from the compressor 8 is supplied, the gas header 70 can be more reliable.

In this way, by constituting the distributing space 25a by a layered body including the third internal plate 73a to the sixth internal plate 76a, it is possible to reduce the plate thickness per internal plate. Therefore, the third internal opening 73x to the seventh internal opening 76x of the third internal plate 73a to the sixth internal plate 76a can be easily formed by a simple pressing operation without the necessity of a cutting operation or other operations.

5-2

The gas header 70 of the outdoor heat exchanger 11 of one or more embodiments has a structure in which the opening width in the left-right direction at the third internal opening 73x, the fourth internal opening 74x, the fifth internal opening 75x, and the sixth internal opening 76x decrease after increasing once toward the back. Therefore, it is possible to further effectively disperse stress and to increase the pressure-resistance strength. Further, by making small the left-right width of the sixth internal opening 76x, it is possible to narrow a plane of the back surface of the external plate 77a exposed to the distributing space 25a. Therefore, even if the plate thickness of the seventh member 77 is not large, it is possible to ensure pressure-resistance strength. Consequently, the main gas-pipe connection opening 77x and the branch gas-pipe connection opening 77y of the seventh member 77 can be easily formed by a simple pressing operation without the necessity of a cutting operation or other operations.

5-3

In the gas header 70 of the outdoor heat exchanger 11 of one or more embodiments, the structure of increasing the pressure-resistance strength by using different opening widths as described above is applied not to the small insertion spaces 25b, which are separated for the respective flat tubes 28, of the gas-side internal space 25 of the gas header 70, but to the distributing space 25a, in which a large amount of refrigerant flows and which is a wider space. In this way, in the wide space, the pressure-receiving surfaces for partitioning the wide space tend to be widened and the pressure-resistance strength tends to be required. However, in one or more embodiments, since the structure that increases the pressure-resistance strength above is used at locations where the pressure-resistance strength is further required, the effects of increasing the pressure-resistance strength can be sufficiently provided.

5-4

In the gas header 70 of the outdoor heat exchanger 11 of one or more embodiments, the second member 72 to the seventh member 77 are brought together by the first member 71 as a result of being surrounded by the first member 71, and are joined to each other by brazing. Therefore, it is possible to further increase the pressure-resistance strength as the gas header 70.

5-5

In the gas header 70 of the outdoor heat exchanger 11 of one or more embodiments, the third internal opening 73x to the sixth internal opening 76x are formed near the center in the left-right direction and the up-down direction. Therefore, it is possible to sufficiently ensure the portions around the openings of the third member 73 to the sixth member 76. Consequently, even from this point, it is possible to further increase the pressure-resistance strength of the gas header 70.

5-6

In the air conditioner 1 of one or more embodiments, carbon dioxide used as a refrigerant is used so as to be temporarily in a supercritical state in a refrigeration cycle. In this way, even when used with the refrigerant pressure in the refrigerant circuit 6 being in a high state, since the pressure-resistance strength of the gas header 70 is increased as described above, the air conditioner 1 can be more reliable.

5-7

In cylindrical gas headers known in the art, when flat tubes, which are flat heat transfer tubes, are to be inserted, the flat tubes need to be inserted by a large amount into the gas header so that the entire end portion of each flat tube is positioned inside the cylindrical gas header. Therefore, in the inside of cylindrical gas headers, useless space where a refrigerant is retained is formed above and below the end portions of the flat tubes. This tendency becomes noticeable with increasing width of the flat tubes.

In contrast, in the gas header 70 of the outdoor heat exchanger 11 of one or more embodiments, the flat-tube-connection plate 71a of the first member 71 has a plate shape, and the flat tubes 28 are inserted perpendicularly to the flat-tube-connection plate 71a.

Therefore, since the gas header 70 of the outdoor heat exchanger 11 of one or more embodiments has a structure that is established as long as even if an end of each flat tube 28 is inserted slightly beyond the flat-tube-connection plate 71a of the first member 71, useless space where a refrigerant is retained can be small around the end portion of each flat tube 28.

5-8

In the gas header 70 of the outdoor heat exchanger 11 of one or more embodiments, the first member 71 including the flat-tube-connection plate 71a is relatively thin. Therefore, when, in a stage before the joining by brazing, the flat tubes 28 are inserted into the flat-tube connection openings 71x, friction that is produced between the inner peripheral surfaces of the flat-tube connection openings 71x and the outer peripheral surfaces of the flat tubes 28 can be kept low, and the insertion operation can be facilitated.

Even if the first member 71 including the flat-tube-connection plate 71a is thin, since the gas-side internal space 25 of the gas header 70 is constituted by stacking the plate-shaped members 71 to 77, it is possible to increase the pressure-resistance strength of the gas header 70.

(6) Modifications (6-1) Modification A

In the embodiments above, an example in which the third internal opening 73x to the sixth internal opening 76x of the gas header 70 are formed near the center in the left-right direction has been given and described.

In contrast, the third internal opening 73x to the sixth internal opening 76x may be formed, for example, to be disposed toward an upstream side of a flow of air that is supplied to a heat exchanger. In this case, since a larger amount of refrigerant can be supplied to a windward side where the temperature difference between a refrigerant and air is considerable, it is possible to increase heat exchange efficiency.

(6-2) Modification B

In the embodiments above, an example in which carbon dioxide is used as a refrigerant has been given and described.

In contrast, the refrigerant is not limited thereto, and, for example, a refrigerant, such as R32 or 410A, may be used.

(6-3) Modification C

In the embodiments above, an example in which the edge portions of the opening of each internal plate each face a corresponding one of the upward direction, the downward direction, the rightward direction, and the leftward direction, and are planes parallel to the plate-thickness direction has been given and described.

In contrast, the edge portions of the opening of each internal plate may be planes that are not parallel to the plate-thickness direction, or may not constitute planes as a result of, for example, being curved.

(6-4) Modification D

In the embodiments above, an example of a structure in which, when viewed from the front, the third internal opening 73x and the fifth internal opening 75x are completely disposed within the fourth internal opening 74x has been given and described.

In contrast, the relationship between each internal opening is not limited thereto, and, for example, when viewed from the front, the third internal opening 73x and the fifth internal opening 75x may each have a portion that does not overlap the fourth internal opening 74x, and the fourth internal opening 74x may also have a portion that does not overlap the third internal opening 73x and the fifth internal opening 75x.

(6-5) Modification E

In the embodiments above, an example in which, when viewed from the front, the third internal opening 73x to the sixth internal opening 76x have rectangular shapes has been given and described.

In contrast, the shape of each internal opening is not limited, and may be, for example, a square shape, an elliptical shape, or a circular shape.

(6-6) Modification F

An example in which, in the gas header 70 of the embodiments above, the fifth internal opening 75x of the fifth member 75 and the sixth internal opening 76x of the sixth member 76 have different widths in the left-right direction has been given and described.

Figure 17:
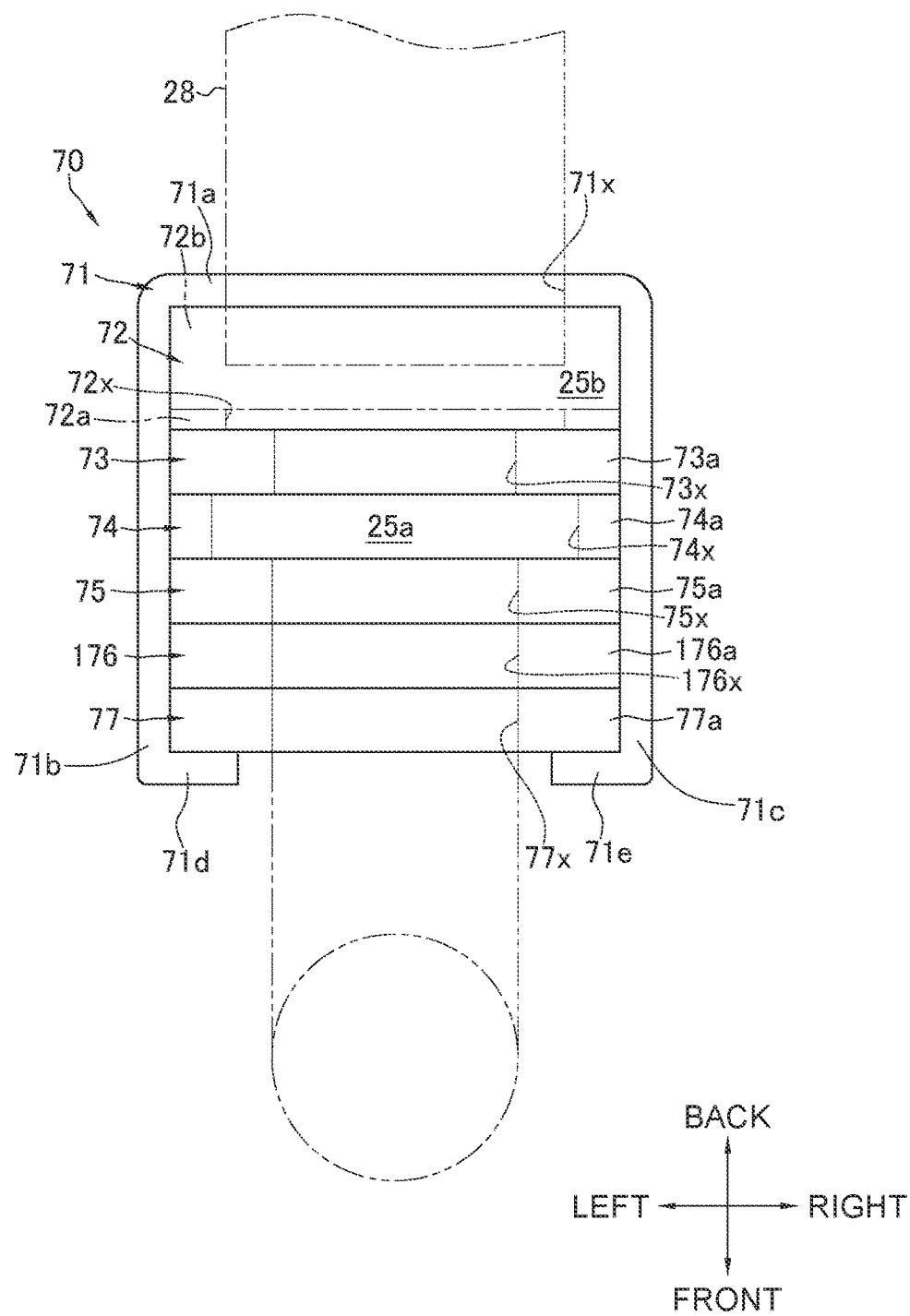
FIG. 17 is a plan sectional view of a gas header according to Modification F of one or more embodiments.

In contrast, as the gas header 70, for example, as shown in FIG. 17, a gas header 70 that includes an eighth member 176 instead of the sixth member 76 having the sixth internal opening 76x of the embodiments above may be provided. The eighth member 176 has an eighth internal opening 176x. The width of the eighth internal opening 176x in the left-right direction is the same as the width of the fifth internal opening 75x of the fifth member 75. In this way, even when the widths of the openings of two or more plate members of the gas header 70 are the same, for example, compared with one member that is thick, such as one member in which the fifth member 75 and the eighth member 176 are integrated with each other, surfaces that receive the refrigerant pressure in the internal space of the gas header 70 can be reduced. Therefore, it is possible to disperse stress and to increase pressure-resistance strength.

(6-7) Others

Note that it is desirable that the width of the opening in the first direction of the plate member (for example, the third plate member) positioned closest to an end portion of each heat transfer tube be smaller than the width of the heat transfer tubes in the first direction.

Note that, when viewed in the plate-thickness direction, the area of the overlapping region where the first opening and the second opening overlap each other is desirably greater than or equal to half of the area of the first opening and greater than or equal to half of the area of the second opening, and is more desirably greater than or equal to 70% of the area of the first opening and greater than or equal to 70% of the area of the second opening.

When viewed in the plate-thickness direction, it is desirable that two end portions of the second opening in the first direction be positioned on outer sides of two end portions of the first opening in the first direction.

Supplementary Note

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 air conditioner (heat pump device)
6 refrigerant circuit
11 outdoor heat exchanger (heat exchanger)
19 gas-refrigerant pipe
25 gas-side internal space (internal space)
28 flat tube (heat transfer tube)
70 gas header (header)
71 first member (outer member)
71a flat-tube connection plate (plate-shaped portion)
71b first outer wall (first side surface portion)
71c second outer wall (second side surface portion)
72 second member
72x distributing opening
73 third member
73x third internal opening (third opening)
74 fourth member (second plate member)
74x fourth internal opening (second opening)
75 fifth opening (first plate member)
75x fifth internal opening (first opening)
76 sixth member
77 seventh member
176 eighth opening (second plate member)
176x eighth internal opening (second opening)

The invention claimed is:
1. A heat exchanger comprising:
a gas-refrigerant pipe;
a header connected to the gas-refrigerant pipe; and
heat transfer tubes connected to the header,
wherein the header includes:
   a first plate member; and
   a second plate member that is stacked on the first plate member in a plate-thickness direction,
wherein the first plate member includes a first opening that constitutes an internal space of the header,
wherein the second plate member includes a second opening that, together with the first opening, constitutes the internal space of the header,
wherein the internal space of the header communicates with the heat transfer tubes, wherein a first direction is perpendicular to both the plate-thickness direction and a direction in which the heat transfer tubes are arranged, wherein a width of a part of the first opening in the first direction is different from a width of the second opening in the first direction, wherein the heat transfer tubes connect to the header at connection portions, wherein, when viewed in the plate-thickness direction, an overlapping region of the first opening and the second opening overlaps a cross section of connection portions of two or more of the heat transfer tubes, wherein the second plate member is disposed at a position that is closer to the connection portions than the first plate member, wherein a width of a part of the second opening in the first direction is larger than the width of the first opening in the first direction, wherein the first plate member includes, at a surface on a side at which the second plate member is stacked, a pressure-receiving surface that extends to an inner side of the width of the second opening in the first direction from an outer side of the width of the first opening in the first direction, and that faces the internal space of the header, and wherein, when viewed in the plate-thickness direction, the cross-sectional area of the overlapping region is greater than or equal to half of the cross-sectional area of the first opening and greater than or equal to half of the cross-sectional area of the second opening.

2. The heat exchanger according to claim 1, wherein the header further comprises a third plate member that includes a third opening, wherein the third plate member is stacked on the second plate member in the plate-thickness direction, wherein the third plate member is disposed at a position that is closer to the connection portions than the second plate member, and wherein a width of a part of the third opening in the first direction is smaller than the width of the second opening in the first direction.

3. The heat exchanger according to claim 1, wherein, when the header is viewed from the direction in which the heat transfer tubes are arranged, the first opening and the second opening do not overlap the heat transfer tubes.

4. The heat exchanger according to claim 1, wherein the header further includes an outer member that includes a plate-shaped portion that connects to the heat transfer tubes, wherein the outer member includes a first side surface portion and a second side surface portion that extend in the plate-thickness direction from a corresponding one of two ends of the plate-shaped portion in the first direction, and that face each other, and wherein the first plate member and the second plate member are disposed between the first side surface portion and the second side surface portion.

5. The heat exchanger according to claim 1, wherein the first plate member and the second plate member each have a plate thickness of 3 mm or less.

6. The heat exchanger according to claim 1, wherein the heat transfer tubes are arranged in a longitudinal direction of the header.

7. The heat exchanger according to claim 1, wherein the heat transfer tubes are flat tubes.

8. A heat pump device comprising:

the heat exchanger according to claim 1.

9. The heat pump device according to claim 8, further comprising:

a refrigerant circuit that includes the heat exchanger that circulates a carbon dioxide refrigerant.

* * * * *